(12) United States Patent
Safai et al.

(10) Patent No.: US 10,748,735 B2
(45) Date of Patent: Aug. 18, 2020

(54) MULTI-SPECTRAL X-RAY TARGET AND SOURCE

(71) Applicant: The Boeing Company, Chicago, IL (US)

(72) Inventors: Morteza Safai, Newcastle, WA (US); Gary Georgeson, Tacoma, WA (US); Barry R. Fox, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/940,796

(22) Filed: Mar. 29, 2018

(65) Prior Publication Data
US 2019/0304735 A1    Oct. 3, 2019

(51) Int. Cl.
*H01J 35/10* (2006.01)
*H01J 35/18* (2006.01)
*H01J 35/06* (2006.01)

(52) U.S. Cl.
CPC .............. *H01J 35/10* (2013.01); *H01J 35/06* (2013.01); *H01J 35/18* (2013.01)

(58) Field of Classification Search
CPC ............. H01J 35/06; H01J 35/10; H01J 35/18
See application file for complete search history.

(56) References Cited

U.S. PATENT DOCUMENTS

| | | | |
|---|---|---|---|
| 2,298,335 A | 10/1942 | Atlee | |
| 2,345,722 A | 4/1944 | Atlee | |
| 3,610,984 A | 10/1971 | Seki et al. | |
| 3,753,020 A | 8/1973 | Zingaro | |
| 4,017,757 A | 4/1977 | Deou, Jr. | |
| 4,870,671 A | 9/1989 | Hershyn | |
| 6,560,315 B1* | 5/2003 | Price | H01J 35/10 378/125 |
| 2011/0222664 A1* | 9/2011 | Behling | H01J 35/06 378/124 |
| 2012/0163530 A1* | 6/2012 | Sainath | A61B 6/027 378/5 |
| 2014/0126698 A1* | 5/2014 | Behling | H01J 35/10 378/62 |

* cited by examiner

*Primary Examiner* — David P Porta
*Assistant Examiner* — Fani Boosalis
(74) *Attorney, Agent, or Firm* — Haynes and Boone LLP

(57) ABSTRACT

Systems, methods, and apparatus for a multi-spectral X-ray target and source are disclosed. In one or more embodiments, a disclosed method comprises emitting, by a source of the X-ray generator, electrons towards a section of a multi-spectral X-ray target of the X-ray generator. In one or more embodiments, the multi-spectral X-ray target is rotatable and comprises a plurality of sections, which each comprise an X-ray generating material and at least two of the sections comprise a different X-ray generating material. The method further comprises generating a set of X-rays, when the electrons impinge on the section of the multi-spectral X-ray target. The method further comprises rotating the multi-spectral X-ray target such that the source is in position to project the electrons towards another section of the multi-spectral X-ray target. Further, the method comprises repeating the above method steps for all of the remaining sections of the multi-spectral X-ray target.

20 Claims, 14 Drawing Sheets

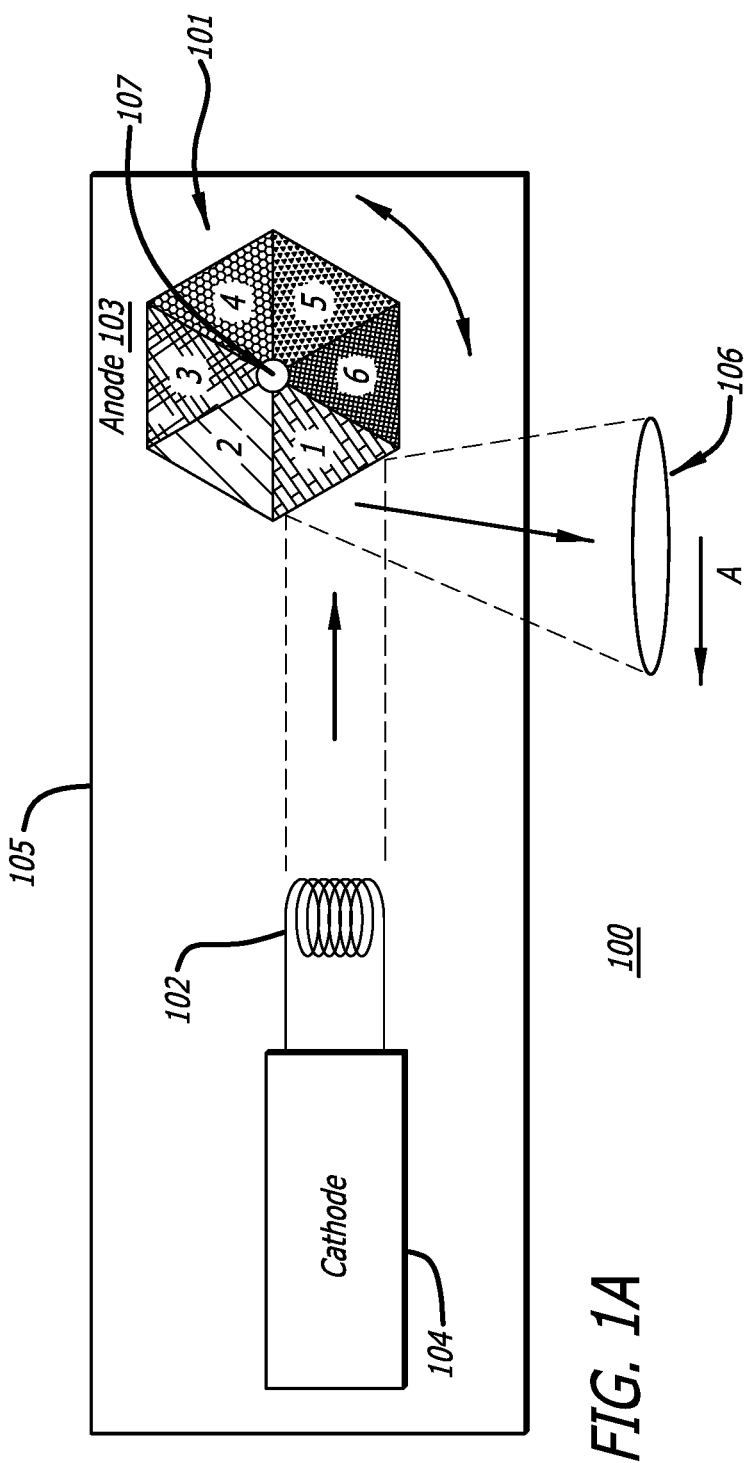
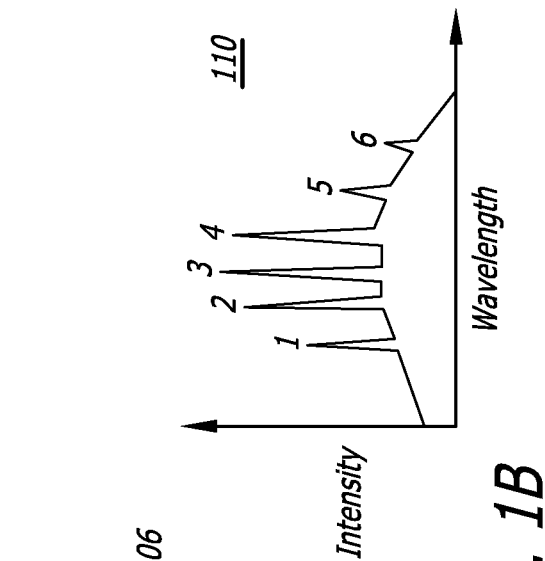
FIG. 1A
FIG. 1B

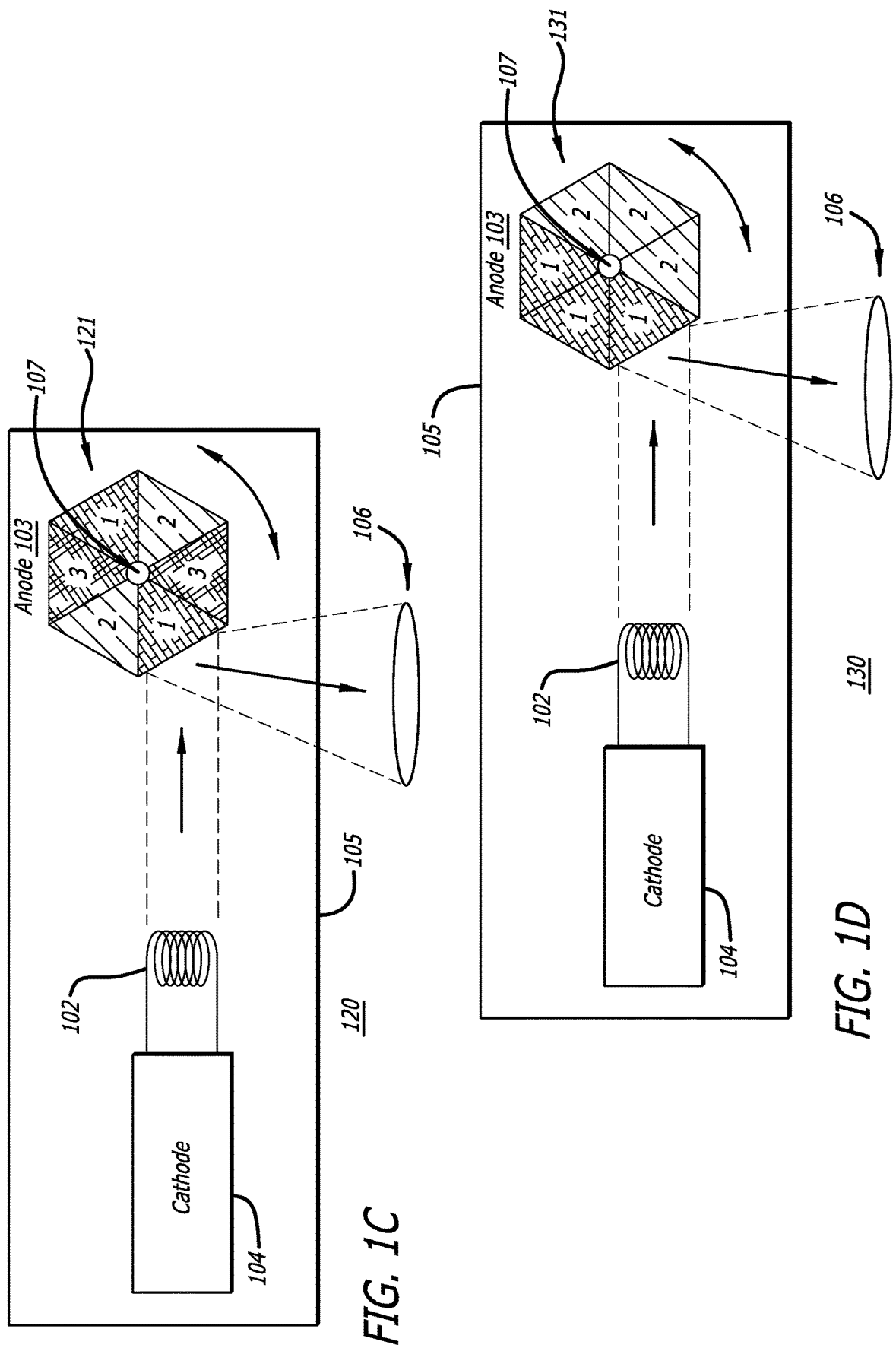

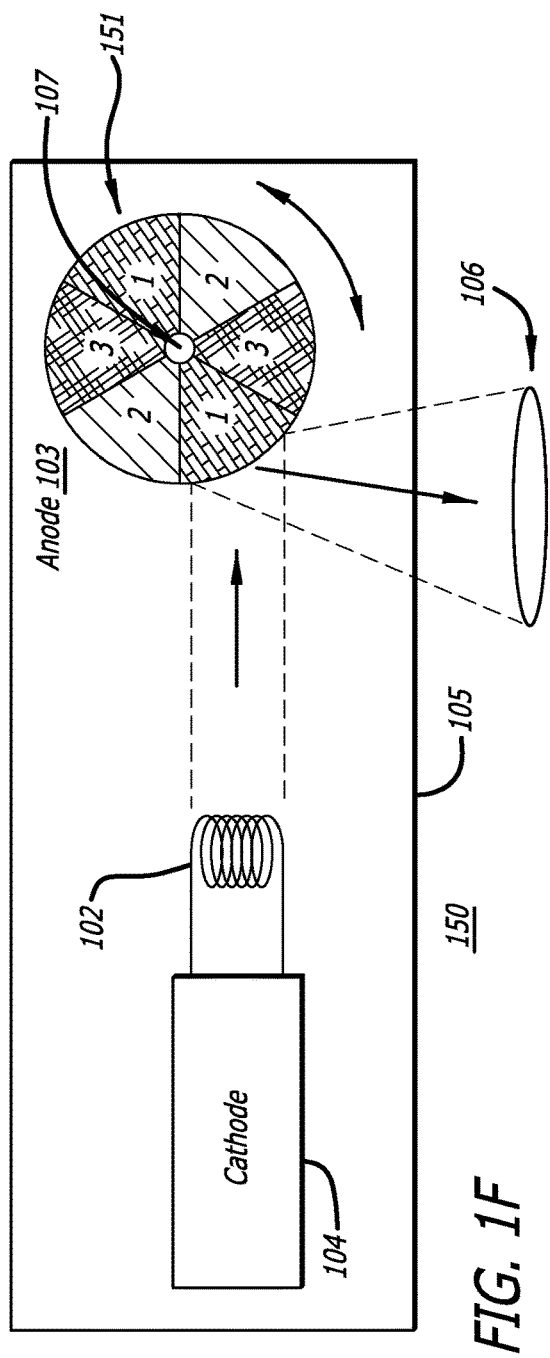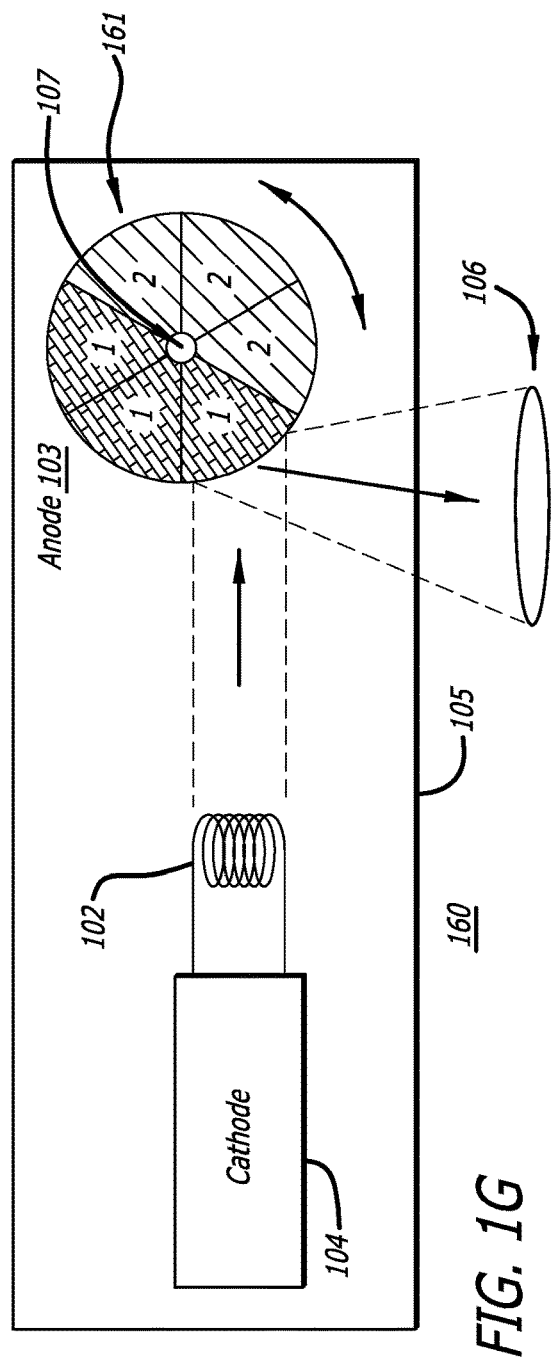

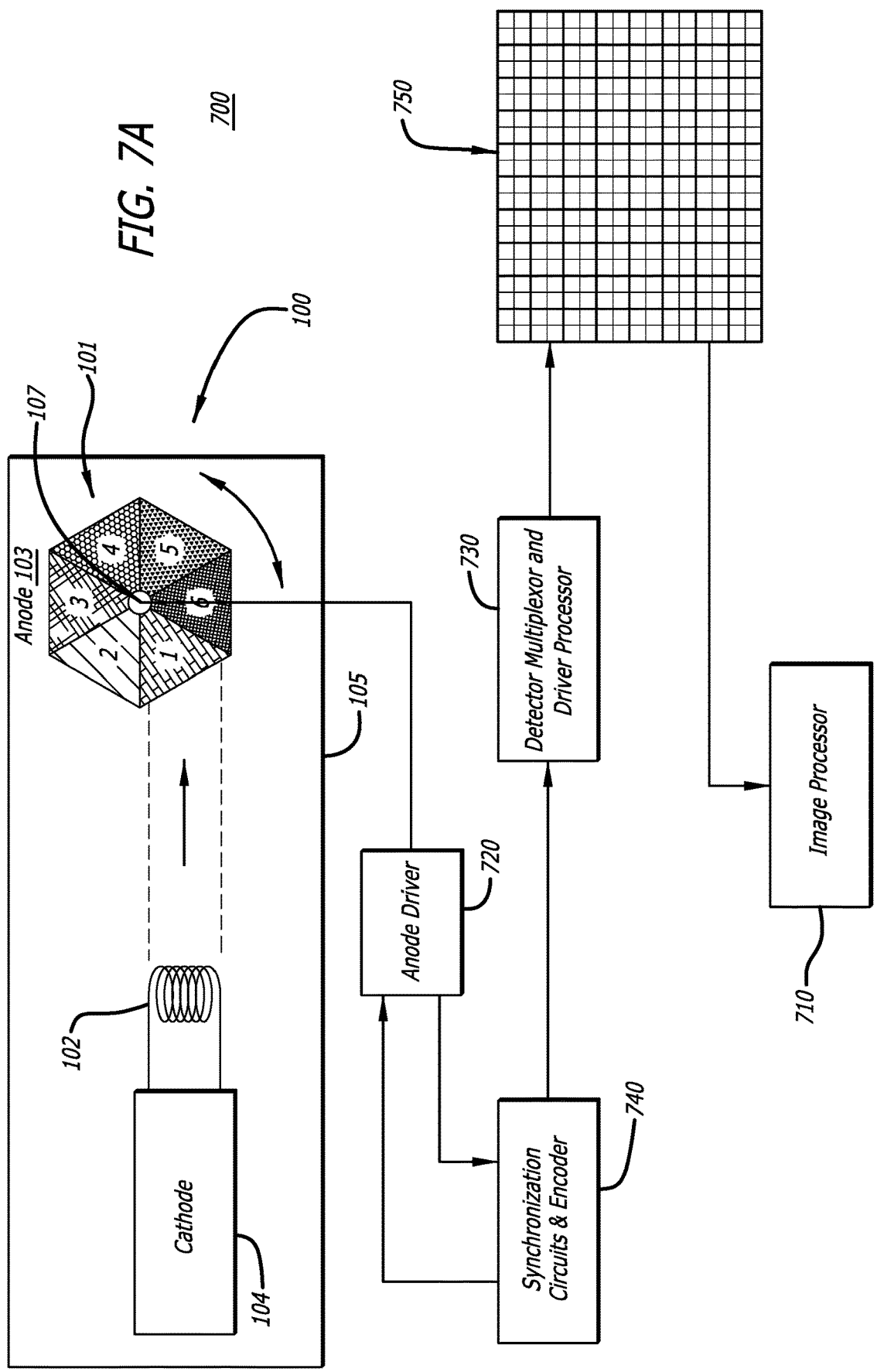

MULTI-SPECTRAL X-RAY TARGET AND SOURCE

FIELD

The present disclosure relates to an X-ray generator. In particular, it relates to an X-ray generator comprising a multi-spectral X-ray target and source.

BACKGROUND

X-ray generators produce X-rays and, along with X-ray detectors, are commonly used in applications including, but not limited to, medicine, fluorescence, electronic assembly inspection, and measurements of material thickness in manufacturing operations. During operation of an X-ray generator, a source of a cathode of the generator emits electrons. The electrons impinge on a target of an anode of the generator, which results in the production of X-rays at the target in the form of a beam.

Currently, sources of conventional X-ray generators can only produce a constant X-ray characteristic energy because the anodes of these X-ray generators comprise a fixed target of a single material (e.g., Tungsten (W)), which produces a constant X-ray characteristic energy. Since existing conventional X-ray generators have a fixed target of a single material, these generators do not allow for target monitoring at a variety of X-ray characteristic energy peaks, which is needed for accurate discrimination applications (e.g., security applications and nondestructive testing applications). Accurate discrimination is often required for applications, such as bomb detection, fuel leaks, and corrosion detection.

There is therefore a need for an improved X-ray generator that allows for accurate discrimination applications (e.g., accurate discrimination of specimens).

SUMMARY

The present disclosure relates to a method, system, and apparatus for an X-ray generator comprising a multi-spectral X-ray target and source. In one or more embodiments, a method for operating an X-ray generator comprises emitting, by a source of the X-ray generator, electrons towards a first section of a multi-spectral X-ray target of the X-ray generator. In one or more embodiments, the multi-spectral X-ray target is rotatable and comprises a plurality of sections including the first section, and each of the sections comprises an X-ray generating material and at least two of the sections comprise a different X-ray generating material. The method further comprises generating, by the first section of the multi-spectral X-ray target, a first set of X-rays, when the electrons impinge on the first section of the multi-spectral X-ray target. In at least one embodiment, the first set of X-rays comprises a first peak characteristic energy (i.e. a characteristic peak intensity of energy at a specific wavelength).

In one or more embodiments, the method further comprises rotating, by an anode driver, the multi-spectral X-ray target such that the source is in position to project the electrons towards a second section of the multi-spectral X-ray target. Also, the method comprises emitting, by the source, the electrons towards the second section of the multi-spectral X-ray target of the X-ray generator. Further, the method comprises generating, by the second section of the multi-spectral X-ray target, a second set of X-rays, when the electrons impinge on the second section of the multi-spectral X-ray target.

In at least one embodiment, the second section of the multi-spectral X-ray target comprises a different X-ray generating material than the first section, and the second set of X-rays comprises a second peak characteristic energy.

In one or more embodiments, the method further comprises repeating, for all of the remaining sections of the multi-spectral X-ray target, rotating the multi-spectral X-ray target such that the source is in position to project the electrons towards another section of the multi-spectral X-ray target, emitting the electrons towards another section of the multi-spectral X-ray target, and generating another set of X-rays.

In at least one embodiment, each of the sections of the multi-spectral X-ray target comprises a different X-ray generating material than one another, and sets of X-rays generated by each of the different sections of the multi-spectral X-ray target each comprise a different peak characteristic energy.

In one or more embodiments, the multi-spectral X-ray target is a multi-facet target, and an external surface of each of the sections comprises a facet. In at least one embodiment, the multi-spectral X-ray target is a multi-sector target, and an external surface of each of the sections comprises an arc.

In at least one embodiment, a method for discriminating a specimen comprises emitting, by a source of an X-ray generator, electrons towards a first section of a multi-spectral X-ray target of the X-ray generator. In at least one embodiment, the multi-spectral X-ray target is rotatable and comprises a plurality of sections including the first section, and each of the sections comprises an X-ray generating material and at least two of the sections comprise a different X-ray generating material. The method further comprises generating, by the first section of the multi-spectral X-ray target, a first set of X-rays, when the electrons impinge on the first section of the multi-spectral X-ray target. In at least one embodiment, the first set of X-rays comprises a first peak characteristic energy. Also, the method comprises radiating, through an X-ray window of the X-ray generator, the first set of X-rays towards at least a portion of the specimen. In addition, the method comprises producing, by the first set of X-rays striking at least a portion of the specimen, a first set of backscattered X-rays. Additionally, the method comprises detecting, by at least one X-ray detector, the first set of X-rays and/or the first set of backscattered X-rays. Further, the method comprises processing, by at least one processor, the first set of X-rays and/or the first set of backscattered X-rays to discriminate the specimen.

In one or more embodiments, the method further comprises rotating, by an anode driver, the multi-spectral X-ray target such that the source is in position to project the electrons towards a second section of the multi-spectral X-ray target. Also, the method comprises emitting, by the source, the electrons towards the second section of the multi-spectral X-ray target of the X-ray generator. In addition, the method comprises generating, by the second section of the multi-spectral X-ray target, a second set of X-rays, when the electrons impinge on the second section of the multi-spectral X-ray target. Additionally, the method comprises radiating, through an X-ray window of the X-ray generator, the second set of X-rays towards at least a portion of the specimen. In addition, the method comprises producing, by the second set of X-rays striking at least a portion of the specimen, a second set of backscattered X-rays. Also, the method comprises detecting, by at least one X-ray detector, the second set of X-rays and/or the second set of backscattered X-rays. Further, the method comprises processing, by at least one processor, the second set of X-rays and/or the second set of backscattered X-rays to further discriminate the specimen.

In at least one embodiment, the second section of the multi-spectral X-ray target comprises a different X-ray generating material than the first section, and the second set of X-rays comprises a second peak characteristic energy.

In one or more embodiments, the method further comprises repeating, for all of the remaining sections of the multi-spectral X-ray target, rotating the multi-spectral X-ray target such that the source is in position to project the electrons towards another section of the multi-spectral X-ray target, emitting the electrons towards another section of the multi-spectral X-ray target, generating another set of X-rays, radiating another set of X-rays towards at least a portion of the specimen, producing another set of backscattered X-rays, detecting another set of X-rays and/or another set of backscattered X-rays, and processing another set of X-rays and/or another set of backscattered X-rays to further discriminate the specimen.

In at least one embodiment, the processing comprises digitizing, by a detector multiplexer and driver processor, at least one of the sets of X-rays and/or at least one of the sets of backscattered X-rays to generate an image for each of the sections of the multi-spectral X-ray target. In addition, the processing further comprises generating, by an image processor, a conglomeration image of the specimen by merging all of the images for each of the sections together.

In at least one embodiment, an X-ray generator system comprises a multi-spectral X-ray target comprising a plurality of sections, and each of the sections comprises an X-ray generating material and at least two of the sections comprise a different X-ray generating material. The system further comprises a source to emit electrons towards a first section of the multi-spectral X-ray target. Also, the system comprises the first section to generate a first set of X-rays, when the electrons impinge on the first section of the multi-spectral X-ray target. In at least one embodiment, the first set of X-rays comprises a first peak characteristic energy. Further, the system comprises an anode driver to rotate the multi-spectral X-ray target such that the source is in position to project the electrons towards another section of the multi-spectral X-ray target.

In one or more embodiments, the system further comprises an X-ray window to allow for the first set of X-rays to radiate through.

In at least one embodiment, the system further comprises at least one X-ray detector to detect the first set of X-rays and/or a first set of backscattered X-rays, which are produced from the first set of X-rays striking at least a portion of a specimen. In some embodiments, the X-ray detector is a one-dimensional (1D) detector or a two-dimensional (2D) detector.

In one or more embodiments, the system further comprises at least one processor to process the first set of X-rays and/or the first set of backscattered X-rays to discriminate the specimen.

In at least one embodiment, each of the sections of the multi-spectral X-ray target comprises a different X-ray generating material than one another, and sets of X-rays generated by each of the different sections of the multi-spectral X-ray target each comprise a different peak characteristic energy.

In one or more embodiments, the multi-spectral X-ray target is a multi-facet target, and an external surface of each of the sections comprises a facet. In at least one embodiment, the multi-spectral X-ray target is a multi-sector target, and an external surface of each of the sections comprises an arc. In some embodiments, each of the X-ray generating materials is Tungsten (W), Rhenium (Re), Molybdenum (Mo), Niobium (Nb), Tantalum (Ta), or Iridium (Ir).

In at least one embodiment, a method for discriminating a specimen comprises, for each location to be scanned on the specimen, capturing data for at least one full rotation of a multi-spectral X-ray target of an X-ray generator. In one or more embodiments, the multi-spectral X-ray target comprises a plurality of sections and at least two of the sections comprise a different X-ray generating material. In some embodiments, the data is in a form of a line of pixels for each of the sections for each of the full rotations. The method further comprises (1) merging all of the data for a particular section together to form a single spectral image of the specimen, or (2) merging all of the data for each of the full rotations to form a multi-spectral line of pixels for each of the full rotations and merging all of the multi-spectral lines of pixels together to form a multi-spectral image of the specimen.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1A is a diagram showing the disclosed X-ray generator comprising a multi-spectral X-ray target and source, where the multi-spectral X-ray target is a multi-facet target and comprises six (6) different X-ray generating materials, in accordance with at least one embodiment of the present disclosure.

FIG. 1B is a graph showing various different X-ray characteristic energy peaks for different X-ray generating materials.

FIG. 1C is a diagram showing the disclosed X-ray generator comprising a multi-spectral X-ray target and source, where the multi-spectral X-ray target is a multi-facet target and comprises three (3) different X-ray generating materials, in accordance with at least one embodiment of the present disclosure.

FIG. 1D is a diagram showing the disclosed X-ray generator comprising a multi-spectral X-ray target and source, where the multi-spectral X-ray target is a multi-facet target and comprises two (2) different X-ray generating materials, in accordance with at least one embodiment of the present disclosure.

FIG. 1F is a diagram showing the disclosed X-ray generator comprising a multi-spectral X-ray target and source, where the multi-spectral X-ray target is a multi-sector target and comprises three (3) different X-ray generating materials, in accordance with at least one embodiment of the present disclosure.

FIG. 1G is a diagram showing the disclosed X-ray generator comprising a multi-spectral X-ray target and source, where the multi-spectral X-ray target is a multi-sector target and comprises two (2) different X-ray generating materials, in accordance with at least one embodiment of the present disclosure.

FIG. 7A is a diagram showing the disclosed system for a multi-spectral X-ray target and source, in accordance with at least one embodiment of the present disclosure.

Figure 8A:
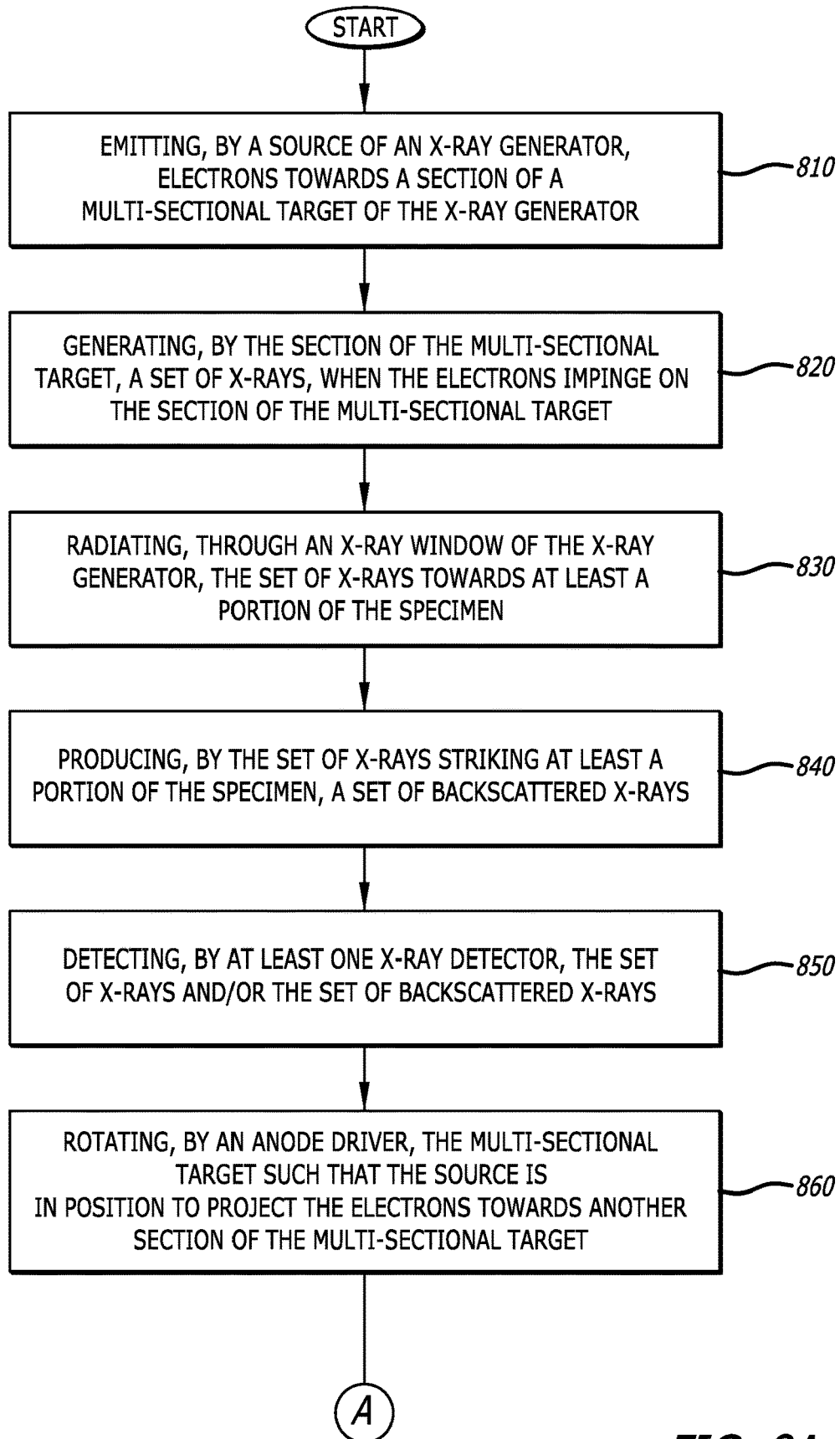
Figure 8B:
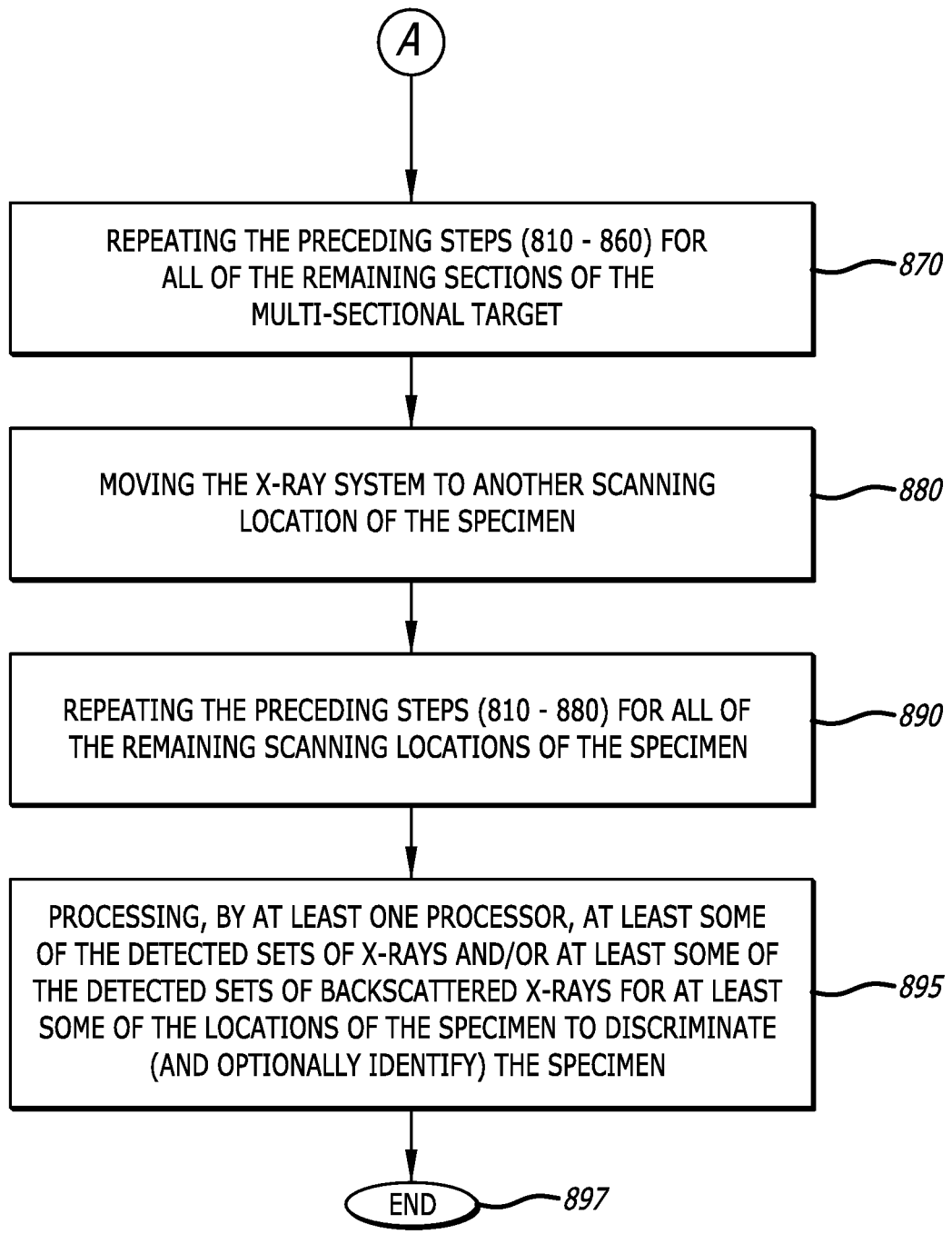

FIGS. 8A and 8B together are a flow chart showing the disclosed method for a multi-spectral X-ray target and source, in accordance with at least one embodiment of the present disclosure.

DESCRIPTION

The methods and apparatus disclosed herein provide an operative system for an X-ray generator comprising a multi-spectral X-ray target and source. In one or more embodiments, the system of the present disclosure provides a multi-spectral X-ray target and source that allows for the scanning of a specimen under test with different X-ray target alloy materials for discrimination and identification of the specimen. The different materials of the multi-spectral X-ray target allow for the discrimination of the atomic structure of the specimen based on the different peak X-ray characteristic energies of the different materials.

As previously mentioned above, X-ray generators produce X-rays and, along with X-ray detectors, are commonly used in applications including, but not limited to, medicine, fluorescence, electronic assembly inspection, and measurements of material thickness in manufacturing operations. During operation of an X-ray generator, a source of a cathode of the generator emits electrons. The electrons impinge on a target of an anode of the generator, which results in the production of X-rays at the target in the form of a beam.

Currently, sources of conventional X-ray generators can only produce a constant X-ray characteristic energy because the anodes of these X-ray generators comprise a fixed target of a single material (e.g., Tungsten (W)), which produces a constant X-ray characteristic energy. Since existing conventional X-ray generators have a fixed target of a single material, these generators do not allow for target monitoring at a variety of X-ray characteristic energy peaks, which is needed for accurate discrimination applications (e.g., security applications and nondestructive testing applications). Accurate discrimination is often required for applications, such as bomb detection, fuel leaks, and corrosion detection.

The system of the present disclosure provides an X-ray generator comprising a multi-spectral X-ray target, where each of the sections comprises a different X-ray generating material (e.g., Tungsten (W), Rhenium (Re), Molybdenum (Mo), Niobium (Nb), Tantalum (Ta), or Iridium (Ir)). Each of the different X-ray generating materials has a different peak characteristic energy (i.e. a different characteristic peak intensity of energy at a specific wavelength). Scanning a specimen with different X-ray target materials allows for the discrimination of the atomic structure of the specimen based on the different peak characteristic energies of the different materials. This level of discrimination allows for exceptionally accurate discrimination and identification of the specimen.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to X-ray generators and systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1A is a diagram showing the disclosed X-ray generator 100 comprising a multi-spectral X-ray target 101 and source (e.g., a filament) 102, where the multi-spectral X-ray target (i.e. a multi-sectional X-ray target) 101 is a multi-facet target and comprises six (6) different X-ray generating materials, in accordance with at least one embodiment of the present disclosure. In this figure, the X-ray generator 100 comprises an anode 103, which comprises a multi-spectral X-ray target 101, and a cathode 104, which is comprises a source (e.g., a filament) 102 that is a source of electrons. The anode 103 and cathode 104 of the X-ray generator 100 are housed within a housing (e.g., a vacuum tube) 105 (refer, e.g., to 205 in FIG. 2). The X-ray generator 100 also comprises an X-ray window 106, which allows for the generated X-rays to pass through.

The multi-spectral X-ray target 101 is rotatable (e.g., rotatable clockwise and/or counter clockwise) about a fixed axis 107, and comprises a plurality of sections. The multi-spectral X-ray target 101 in this figure is shown to comprise a total of six (6) sections, which are shown to be labeled 1 through 6. However, in other embodiments, the multi-spectral X-ray target 101 may comprise more or less than six sections as is shown in FIG. 1A. In addition, each of the sections of the multi-spectral X-ray target 101 comprises an X-ray generating material. Various different types of X-ray generating materials may be employed for the sections of the multi-spectral X-ray target 101 including, but not limited to, Tungsten (W), Rhenium (Re), Molybdenum (Mo), Niobium (Nb), Tantalum (Ta), Iridium (Ir), or some other suitable material. In FIG. 1A, each of the six sections comprises a different X-ray generating material, as is denoted by the different patterns shown for each section. However, in other embodiments, the sections of the multi-spectral X-ray target 101 may comprise different X-ray generating materials, the same X-ray generating materials, or a combination thereof.

In addition, the multi-spectral X-ray target 101 in this figure is shown to be hexagonal (i.e. comprising six sides) in shape, where the external surface of each section is a facet (e.g., a flat side) and, as such, the multi-spectral X-ray target 101 is a multi-facet target. In other embodiments, the multi-spectral X-ray target 101 is a polygon that may comprise more or less sides than six sides as is shown in FIG. 1A.

Figure 1E:
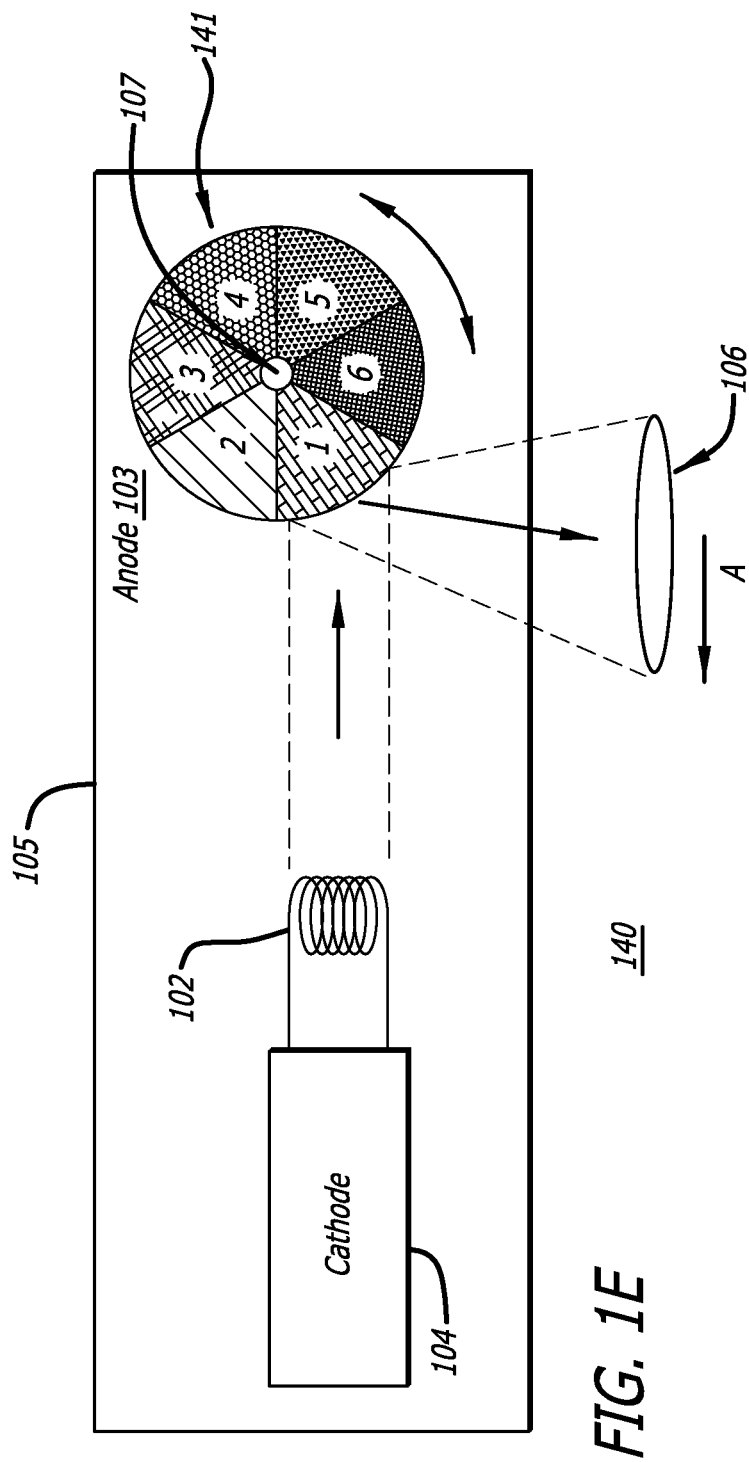
FIG. 1E is a diagram showing the disclosed X-ray generator comprising a multi-spectral X-ray target and source, where the multi-spectral X-ray target is a multi-sector target and comprises six (6) different X-ray generating materials, in accordance with at least one embodiment of the present disclosure.

In addition, it should be noted that in other embodiments, the multi-spectral X-ray target 101 may be of different shapes than a polygon shape as is shown in FIG. 1A. In one or more embodiments, the disclosed multi-spectral X-ray target 101 may be circular shape (e.g., refer to 141 of FIG. 1E, 151 of FIG. 1F, and 161 of FIG. 1G), rectangular shape, square shape, triangular shape, or some other shape suitable for rotation about an axis 107.

During operation of the disclosed X-ray generator 100, the source (e.g., a filament) 105 of the cathode 104 emits electrons towards a section (e.g., section 1) of the multi-spectral X-ray target 101 of the anode 103. When the electrons impinge on that section, the section generates X-rays (e.g., a set of X-rays or X-ray signals) (e.g., a first set of X-rays). The generated X-rays have a peak characteristic energy (e.g., refer peak 1 on graph 110 of FIG. 1B) that is related to the X-ray generating material (e.g., Tungsten (W)) of the section (e.g., section 1).

The generated X-rays are radiated through an X-ray window 106 of the X-ray generator 100 towards a specimen (e.g., refer to 320 of FIG. 3B) to be discriminated and optionally identified. When the X-rays strike the specimen, backscattered X-rays (e.g., a backscattered set of X-rays or backscattered X-ray signals) (e.g., a first set of backscattered X-rays) are produced. At least one X-ray detector (e.g., refer to 330 of FIG. 3A) detects the X-rays (e.g., the first set of X-rays) and/or the backscattered X-rays (e.g., the first set of backscattered X-rays), and at least one processor (e.g., refer to image processor 710 of FIG. 7) processes the X-rays (e.g., the first set of X-rays) and/or the backscattered X-rays (e.g., the first set of backscattered X-rays) to discriminate the specimen.

After the X-rays (e.g., the first set of X-rays) and/or backscattered X-rays (e.g., the first set of backscattered X-rays) are detected by the X-ray detector, an anode driver (e.g., refer to 720 of FIG. 7) rotates the multi-spectral X-ray target 101 such that the source 102 is in position to project electrons towards another section (e.g., section 2) of the multi-spectral X-ray target 101. In one or more embodiments, a locking system may be employed to lock (e.g., the click) the multi-spectral X-ray target 101 in position such that the desired section is in the correct position to receive the electrons from the source 102. It should be noted that in other embodiments, the multi-spectral X-ray target 101 is free spinning (i.e. the multi-spectral X-ray target 101 is not locked into position, but rather is constantly spinning at a known rate of rotation), and an encoder (refer to 740 of FIG. 7) is employed to determine the specific section of the multi-spectral X-ray target 101 that generated the set of X-rays that were detected at a specific time.

The cathode 104 then emits electrons towards the section (e.g., section 2) of the multi-spectral X-ray target 101. When the electrons impinge on that section (e.g., section 2), the section generates X-rays (e.g., a second set of X-rays). The generated X-rays have a peak characteristic energy (e.g., refer peak 2 on graph 110 of FIG. 1B) that is related to the X-ray generating material (e.g., Rhenium (Re)) of the section (e.g., section 2).

The generated X-rays are radiated through the X-ray window 106 towards the specimen to be discriminated and optionally identified. When the X-rays strike the specimen, backscattered X-rays (e.g., a second set of backscattered X-rays) are produced. At least one X-ray detector detects the X-rays (e.g., the second set of X-rays) and/or the backscattered X-rays (e.g., the second set of backscattered X-rays), and the processor(s) processes the X-rays (e.g., the second set of X-rays) and/or the backscattered X-rays (e.g., the second set of backscattered X-rays) to further discriminate the specimen.

After the X-rays (e.g., the second set of X-rays) and/or the backscattered X-rays (e.g., the second set of backscattered X-rays) are detected by the X-ray detector, the anode driver rotates the multi-spectral X-ray target 101 such that the source 102 is in position to project electrons towards another section (e.g., section 3) of the multi-spectral X-ray target 101, and the above discussed process repeats for all of the remaining sections (e.g., section 3, section 4, section 5, and section 6) on the multi-spectral X-ray target 101 to further discriminate (and optionally identify) the specimen.

FIG. 1B is a graph 110 showing various different X-ray characteristic energy peaks for different X-ray generating materials. On this graph 110, the x-axis denotes wavelength, and the y-axis denotes intensity (i.e. energy). The graph 110 shows six peak characteristic energies, which are labeled 1 through 6. Each peak characteristic energy corresponds to a different X-ray generating material. For example, peak characteristic energy 1 may correspond to the X-ray generating material of Tungsten (W), peak characteristic energy 2 may correspond to the X-ray generating material of Rhenium (Re), peak characteristic energy 3 may correspond to the X-ray generating material of Molybdenum (Mo), peak characteristic energy 4 may correspond to the X-ray generating material of Niobium (Nb), peak characteristic energy 5 may correspond to the X-ray generating material of Tantalum (Ta), and peak characteristic energy 6 may correspond to the X-ray generating material of Iridium (Ir). It should be noted that the peak characteristic energies on graph 110 are not necessarily the actual peak characteristic energies for these materials, and are simply shown for illustrative purposes.

FIG. 1C is a diagram showing the disclosed X-ray generator 120 comprising a multi-spectral X-ray target 121 and source (e.g., a filament) 102, where the multi-spectral X-ray target (i.e. a multi-sectional X-ray target) 121 is a multi-facet target and comprises three (3) different X-ray generating materials, in accordance with at least one embodiment of the present disclosure. In this figure, the X-ray generator 120 comprises an anode 103, which comprises a multi-spectral X-ray target 121, and a cathode 104, which is comprises a source (e.g., a filament) 102 that is a source of electrons. The anode 103 and cathode 104 of the X-ray generator 120 are housed within a housing (e.g., a vacuum tube) 105 (refer, e.g., to 205 in FIG. 2). The X-ray generator 120 also comprises an X-ray window 106, which allows for the generated X-rays to pass through.

The multi-spectral X-ray target 121 is rotatable (e.g., rotatable clockwise and/or counter clockwise) about a fixed axis 107, and comprises a plurality of sections. The multi-spectral X-ray target 121 in this figure is shown to comprise a total of six (6) sections, which are shown to be labeled 1, 2, 3, 1, 2, and 3. However, in other embodiments, the multi-spectral X-ray target 121 may comprise more or less than six sections as is shown in FIG. 1C. In addition, each of the sections of the multi-spectral X-ray target 121 comprises an X-ray generating material. Various different types of X-ray generating materials may be employed for the sections of the multi-spectral X-ray target 121 including, but not limited to, Tungsten (W), Rhenium (Re), Molybdenum (Mo), Niobium (Nb), Tantalum (Ta), Iridium (Ir), or some other suitable material. In FIG. 1C, the six sections comprise three different X-ray generating materials, as is denoted by the three different patterns shown on the sections. However, in other embodiments, the sections of the multi-spectral X-ray target 121 may comprise different X-ray generating materials, the same X-ray generating materials, or a combination thereof.

In addition, the multi-spectral X-ray target 121 in this figure is shown to be hexagonal (i.e. comprising six sides) in shape, where the external surface of each section is a facet (e.g., a flat side) and, as such, the multi-spectral X-ray target 121 is a multi-facet target. In other embodiments, the multi-spectral X-ray target 121 is a polygon that may comprise more or less sides than six sides as is shown in FIG. 1C.

In addition, it should be noted that in other embodiments, the multi-spectral X-ray target 121 may be of different shapes than a polygon shape as is shown in FIG. 1C. In one or more embodiments, the disclosed multi-spectral X-ray target 121 may be circular shape (e.g., refer to 141 of FIG. 1E, 151 of FIG. 1F, and 161 of FIG. 1G), rectangular shape, square shape, triangular shape, or some other shape suitable for rotation about an axis 107. The disclosed X-ray generator 120 operates according to the method of operation discussed above for the X-ray generator 100 of FIG. 1A.

FIG. 1D is a diagram showing the disclosed X-ray generator 130 comprising a multi-spectral X-ray target 131 and source (e.g., a filament) 102, where the multi-spectral X-ray target (i.e. a multi-sectional X-ray target) 131 is a multi-facet target and comprises two (2) different X-ray generating materials, in accordance with at least one embodiment of the present disclosure. In this figure, the X-ray generator 130 comprises an anode 103, which comprises a multi-spectral X-ray target 131, and a cathode 104, which is comprises a source (e.g., a filament) 102 that is a source of electrons. The anode 103 and cathode 104 of the X-ray generator 130 are housed within a housing (e.g., a vacuum tube) 105 (refer, e.g., to 205 in FIG. 2). The X-ray generator 130 also comprises an X-ray window 106, which allows for the generated X-rays to pass through.

The multi-spectral X-ray target 131 is rotatable (e.g., rotatable clockwise and/or counter clockwise) about a fixed axis 107, and comprises a plurality of sections. The multi-spectral X-ray target 131 in this figure is shown to comprise a total of six (6) sections, which are shown to be labeled 1, 1, 1, 2, 2, and 2. However, in other embodiments, the multi-spectral X-ray target 131 may comprise more or less than six sections as is shown in FIG. 1D. In addition, each of the sections of the multi-spectral X-ray target 131 comprises an X-ray generating material. Various different types of X-ray generating materials may be employed for the sections of the multi-spectral X-ray target 131 including, but not limited to, Tungsten (W), Rhenium (Re), Molybdenum (Mo), Niobium (Nb), Tantalum (Ta), Iridium (Ir), or some other suitable material. In FIG. 1D, the six sections comprise two different X-ray generating materials, as is denoted by the two different patterns shown on the sections. However, in other embodiments, the sections of the multi-spectral X-ray target 131 may comprise different X-ray generating materials, the same X-ray generating materials, or a combination thereof.

In addition, the multi-spectral X-ray target 131 in this figure is shown to be hexagonal (i.e. comprising six sides) in shape, where the external surface of each section is a facet (e.g., a flat side) and, as such, the multi-spectral X-ray target 131 is a multi-facet target. In other embodiments, the multi-spectral X-ray target 131 is a polygon that may comprise more or less sides than six sides as is shown in FIG. 1D.

In addition, it should be noted that in other embodiments, the multi-spectral X-ray target 131 may be of different shapes than a polygon shape as is shown in FIG. 1D. In one or more embodiments, the disclosed multi-spectral X-ray target 131 may be circular shape (e.g., refer to 141 of FIG. 1E, 151 of FIG. 1F, and 161 of FIG. 1G), rectangular shape, square shape, triangular shape, or some other shape suitable for rotation about an axis 107. The disclosed X-ray generator 130 operates according to the method of operation discussed above for the X-ray generator 100 of FIG. 1A.

FIG. 1E is a diagram showing the disclosed X-ray generator 140 comprising a multi-spectral X-ray target (i.e. a multi-sectional X-ray target) 141 and source (e.g., a filament) 102, where the multi-spectral X-ray target 141 is a multi-sector target and comprises six (6) different X-ray generating materials, in accordance with at least one embodiment of the present disclosure. In this figure, the X-ray generator 140 comprises an anode 103, which comprises a multi-spectral X-ray target 141, and a cathode 104, which is comprises a source (e.g., a filament) 102 that is a source of electrons. The anode 103 and cathode 104 of the X-ray generator 140 are housed within a housing (e.g., a vacuum tube) 105 (refer, e.g., to 205 in FIG. 2). The X-ray generator 140 also comprises an X-ray window 106, which allows for the generated X-rays to pass through.

The multi-spectral X-ray target 141 is rotatable (e.g., rotatable clockwise and/or counter clockwise) about a fixed axis 107, and comprises a plurality of sections. The multi-spectral X-ray target 141 in this figure is shown to comprise a total of six (6) sections, which are shown to be labeled 1 through 6. However, in other embodiments, the multi-spectral X-ray target 141 may comprise more or less than six sections as is shown in FIG. 1E. In addition, each of the sections of the multi-spectral X-ray target 141 comprises an X-ray generating material. Various different types of X-ray generating materials may be employed for the sections of the multi-spectral X-ray target 141 including, but not limited to, Tungsten (W), Rhenium (Re), Molybdenum (Mo), Niobium (Nb), Tantalum (Ta), Iridium (Ir), or some other suitable material. In FIG. 1E, each of the six sections comprises a different X-ray generating material, as is denoted by the different patterns shown for each section. However, in other embodiments, the sections of the multi-spectral X-ray target 141 may comprise different X-ray generating materials, the same X-ray generating materials, or a combination thereof.

In addition, the multi-spectral X-ray target 141 in this figure is shown to be circular in shape, where the external surface of each section is an arc (e.g., a curved side) and, as such, the multi-spectral X-ray target 141 is a multi-sector target. Also, in this figure, each arc is shown to be convex in shape. However, in other embodiments, each arc may be concave in shape. The disclosed X-ray generator 140 operates according to the method of operation discussed above for the X-ray generator 100 of FIG. 1A.

FIG. 1F is a diagram showing the disclosed X-ray generator 150 comprising a multi-spectral X-ray target 151 and source (e.g., a filament) 102, where the multi-spectral X-ray target (i.e. a multi-sectional X-ray target) 151 is a multi-sector target and comprises three (3) different X-ray generating materials, in accordance with at least one embodiment of the present disclosure. In this figure, the X-ray generator 150 comprises an anode 103, which comprises a multi-spectral X-ray target 151, and a cathode 104, which is comprises a source (e.g., a filament) 102 that is a source of electrons. The anode 103 and cathode 104 of the X-ray generator 120 are housed within a housing (e.g., a vacuum tube) 105 (refer, e.g., to 205 in FIG. 2). The X-ray generator 150 also comprises an X-ray window 106, which allows for the generated X-rays to pass through.

The multi-spectral X-ray target 151 is rotatable (e.g., rotatable clockwise and/or counter clockwise) about a fixed axis 107, and comprises a plurality of sections. The multi-spectral X-ray target 151 in this figure is shown to comprise a total of six (6) sections, which are shown to be labeled 1, 2, 3, 1, 2, and 3. However, in other embodiments, the multi-spectral X-ray target 151 may comprise more or less than six sections as is shown in FIG. 1F. In addition, each of the sections of the multi-spectral X-ray target 141 comprises an X-ray generating material. Various different types of X-ray generating materials may be employed for the sections of the multi-spectral X-ray target 141 including, but not limited to, Tungsten (W), Rhenium (Re), Molybdenum (Mo), Niobium (Nb), Tantalum (Ta), Iridium (Ir), or some other suitable material. In FIG. 1F, the six sections comprise three different X-ray generating materials, as is denoted by the three different patterns shown on the sections. However, in other embodiments, the sections of the multi-spectral X-ray target 151 may comprise different X-ray generating materials, the same X-ray generating materials, or a combination thereof.

In addition, the multi-spectral X-ray target 151 in this figure is shown to be circular in shape, where the external surface of each section is an arc (e.g., a curved side) and, as such, the multi-spectral X-ray target 151 is a multi-sector target. Also, in this figure, each arc is shown to be convex in shape. However, in other embodiments, each arc may be concave in shape. The disclosed X-ray generator 150 operates according to the method of operation discussed above for the X-ray generator 100 of FIG. 1A.

FIG. 1G is a diagram showing the disclosed X-ray generator 160 comprising a multi-spectral X-ray target 161 and source (e.g., a filament) 102, where the multi-spectral X-ray target (i.e. a multi-sectional X-ray target) 161 is a multi-sector target and comprises two (2) different X-ray generating materials, in accordance with at least one embodiment of the present disclosure. In this figure, the X-ray generator 160 comprises an anode 103, which comprises a multi-spectral X-ray target 161, and a cathode 104, which is comprises a source (e.g., a filament) 102 that is a source of electrons. The anode 103 and cathode 104 of the X-ray generator 160 are housed within a housing (e.g., a vacuum tube) 105 (refer, e.g., to 205 in FIG. 2). The X-ray generator 160 also comprises an X-ray window 106, which allows for the generated X-rays to pass through.

The multi-spectral X-ray target 161 is rotatable (e.g., rotatable clockwise and/or counter clockwise) about a fixed axis 107, and comprises a plurality of sections. The multi-spectral X-ray target 161 in this figure is shown to comprise a total of six (6) sections, which are shown to be labeled 1, 1, 1, 2, 2, and 2. However, in other embodiments, the multi-spectral X-ray target 161 may comprise more or less than six sections as is shown in FIG. 1G. In addition, each of the sections of the multi-spectral X-ray target 161 comprises an X-ray generating material. Various different types of X-ray generating materials may be employed for the sections of the multi-spectral X-ray target 161 including, but not limited to, Tungsten (W), Rhenium (Re), Molybdenum (Mo), Niobium (Nb), Tantalum (Ta), Iridium (Ir), or some other suitable material. In FIG. 1G, the six sections comprise two different X-ray generating materials, as is denoted by the two different patterns shown on the sections. However, in other embodiments, the sections of the multi-spectral X-ray target 161 may comprise different X-ray generating materials, the same X-ray generating materials, or a combination thereof.

In addition, the multi-spectral X-ray target 161 in this figure is shown to be circular in shape, where the external surface of each section is an arc (e.g., a curved side) and, as such, the multi-spectral X-ray target 161 is a multi-sector target. Also, in this figure, each arc is shown to be convex in shape. However, in other embodiments, each arc may be concave in shape. The disclosed X-ray generator 160 operates according to the method of operation discussed above for the X-ray generator 100 of FIG. 1A.

Figure 2:
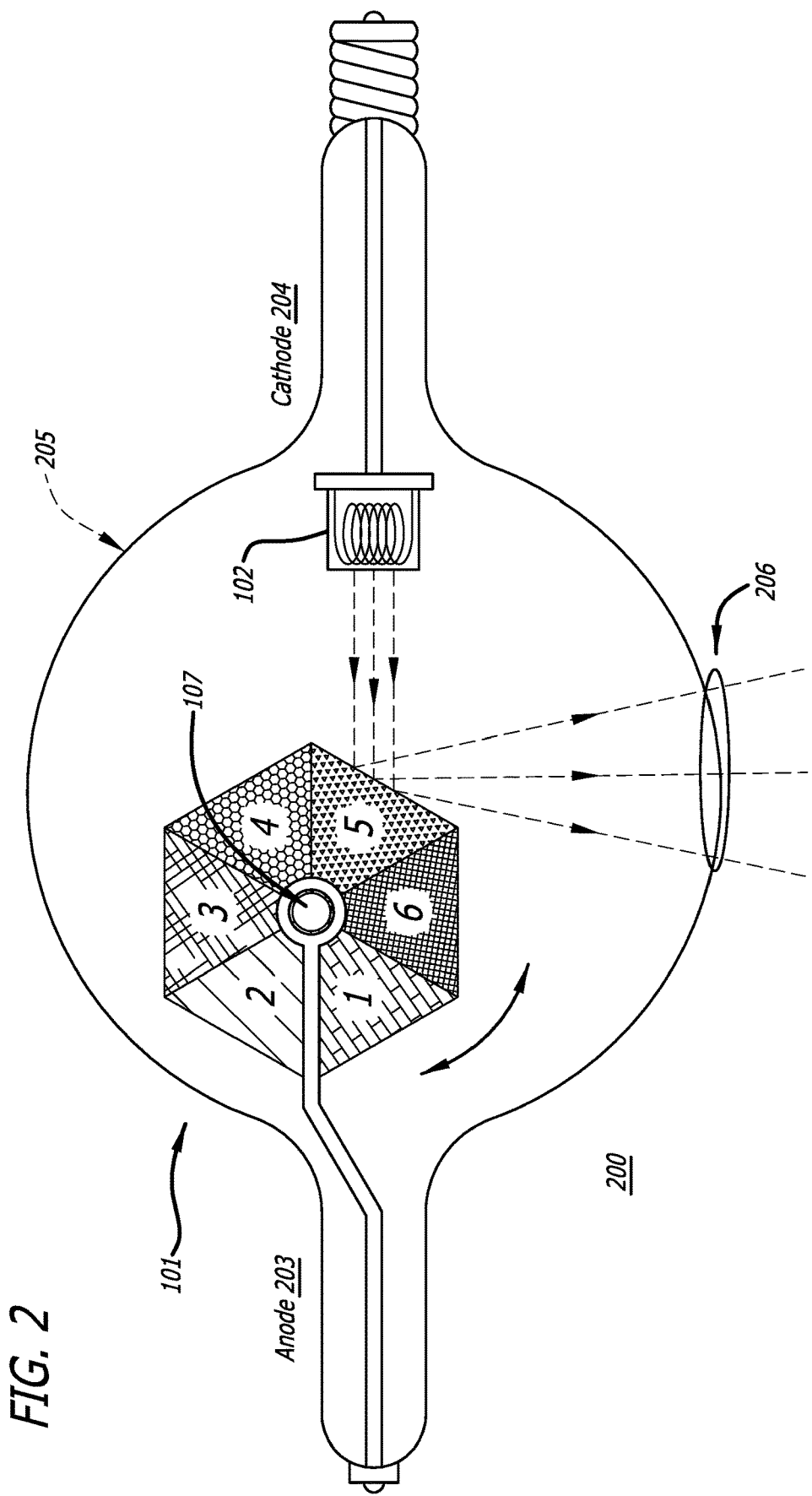
FIG. 2 is a diagram showing the disclosed X-ray generator comprising a multi-spectral X-ray target and source, where the X-ray generator is housed within an X-ray tube, in accordance with at least one embodiment of the present disclosure.

FIG. 2 is a diagram showing the disclosed X-ray generator 200 comprising a multi-spectral X-ray target 101 and source (e.g., a filament) 102, where the X-ray generator 200 is housed within an X-ray tube (i.e. housing) 205, in accordance with at least one embodiment of the present disclosure. In this figure, the X-ray generator 200 comprises an anode 203, which comprises a multi-spectral X-ray target 101, and a cathode 204, which is comprises a source (e.g., a filament) 102 that is a source of electrons. The anode 203 and cathode 204 of the X-ray generator 200 are housed within a housing 205. Since the multi-spectral X-ray target 101, which comprises various different X-ray generating materials, is rotatable, a different X-ray generating material may be utilized for generating a set of X-rays by simply rotating the multi-spectral X-ray target 101 without disturbing the housing 205 (e.g., without the need for removing the multi-spectral X-ray target 101 from the housing 205).

The housing 205 is shown to be a vacuum X-ray tube (e.g., a Coolidge X-ray tube). However, it should be noted that in other embodiments, other types of housings (which are hermetically sealed) may be employed for the housing 205 for the disclosed X-ray generator 200. In addition, the housing 205 may be manufactured from a variety of materials including, but not limited to, glass (e.g., Pyrex glass) and metals. The X-ray generator 200 also comprises an X-ray window 206, which allows for the generated X-rays to pass through. The X-ray window 206 is formed within the housing 205 of the disclosed X-ray generator 200.

Figure 3A:
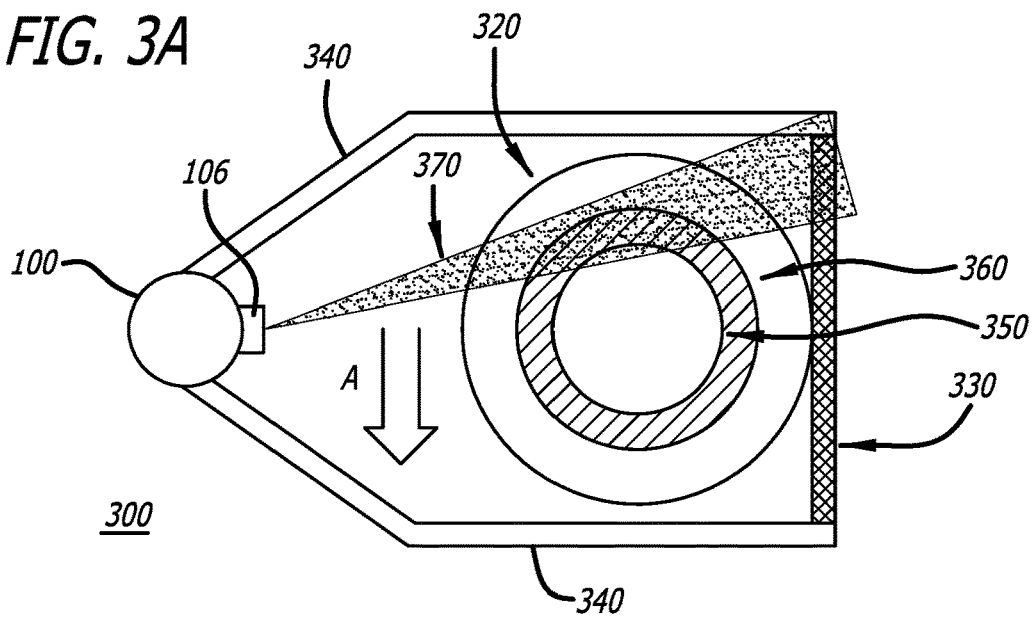
FIG. 3A is a diagram showing a top view of the disclosed system for a multi-spectral X-ray target and source comprising a one-dimensional (1D) X-ray detector, in accordance with at least one embodiment of the present disclosure.

FIG. 3A is a diagram showing a top view 300 of the disclosed system for a multi-spectral X-ray target and source comprising a one-dimensional (1D) X-ray detector 330, in accordance with at least one embodiment of the present disclosure. In this figure, the X-ray generator 100 is shown to be radiating an X-ray beam (e.g., comprising a set of X-rays or X-ray signals) 370 towards an exemplary specimen 320 via its X-ray window 106. The specimen 320 comprises a hollow pipe 350, where the external surface of the pipe 350 is covered with a layer of insulation 360. Also in this figure, the X-ray generator 100 is shown to be connected to the X-ray detector 330 via two metal brackets 340. The X-ray detector 330 in this figure is a 1D X-ray detector.

During operation of the disclosed system, as the multi-spectral X-ray target 101 (refer to the multi-facet target 101 of FIG. 1A) rotates clockwise, the X-ray beam 370 moves (i.e. scans) in the direction denoted by arrow A (refer to FIGS. 3A and 1A) to scan a portion of the specimen 320. As the X-ray beam 370 is being scanned across the surface of the specimen 320, the X-ray detector 330 detects the X-ray beam 370 radiating through the specimen 320.

It should be noted that, in other embodiments, the multi-spectral X-ray target 101 (refer to the multi-facet target 101 of FIG. 1A) may rotate counter clockwise. For these embodiments, when the multi-spectral X-ray target 101 rotates counter clockwise, the X-ray beam 370 will move in a direction that is opposite the direction denoted by arrow A.

In addition, it should be noted that if a multi-sector target (e.g., refer to the circular shaped multi-sector target 141 of FIG. 1E) is employed for the multi-spectral X-ray target 101 instead of a multi-facet target (refer to the polygon shaped multi-facet target 101 of FIG. 1A), then the X-ray beam 370 is stationary and will not scan across the surface of the specimen 320.

Figure 3B:
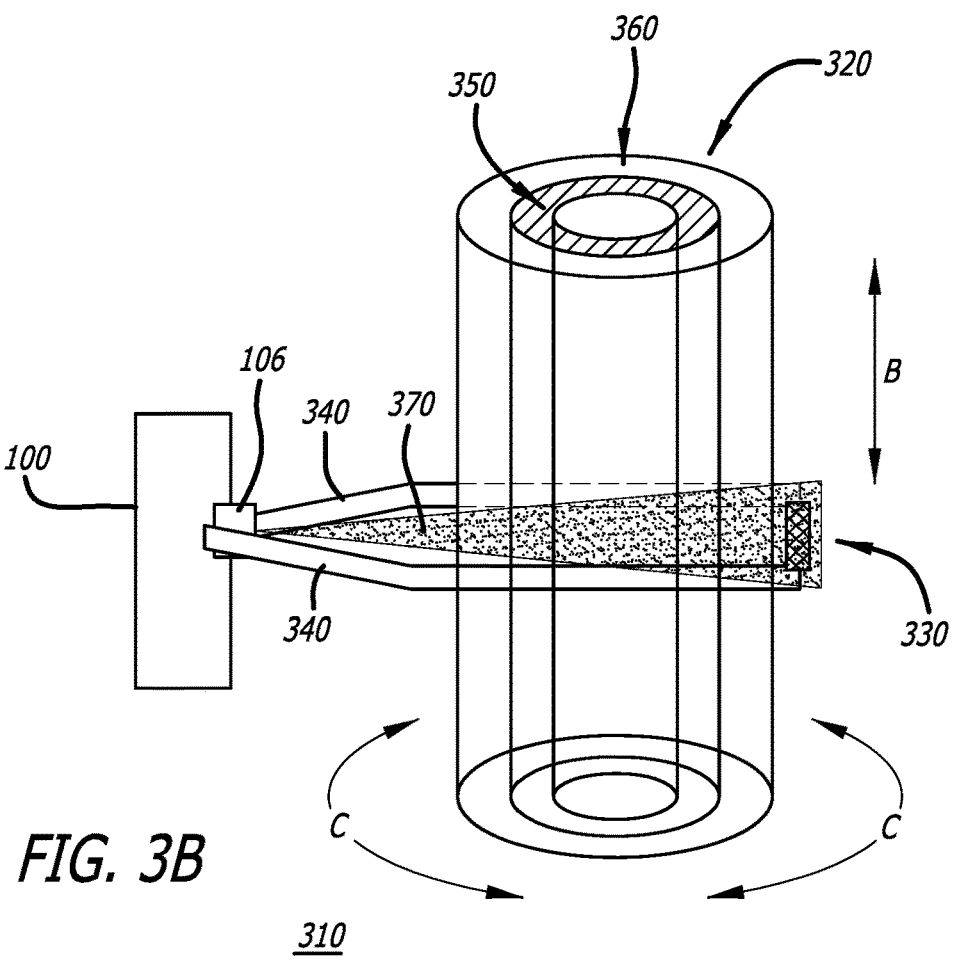
FIG. 3B is a diagram showing a side view of the disclosed system for a multi-spectral X-ray target and source comprising a 1D X-ray detector, in accordance with at least one embodiment of the present disclosure.

FIG. 3B is a diagram showing a side view 310 of the disclosed system for a multi-spectral X-ray target and source comprising a 1D X-ray detector 330, in accordance with at least one embodiment of the present disclosure. In this figure, the side view 310 illustrates how the X-ray generator 100 (along with the attached X-ray detector 330) may move up and down (as denoted by the arrows of line B) along the length of the specimen 320 to scan all of the locations along the length of the specimen 320. In addition, in one or more embodiments, the X-ray generator 100 may rotate around the circumference of the specimen 320 (as denoted by the arrows of lines C) to scan the specimen 320.

Figure 4A:
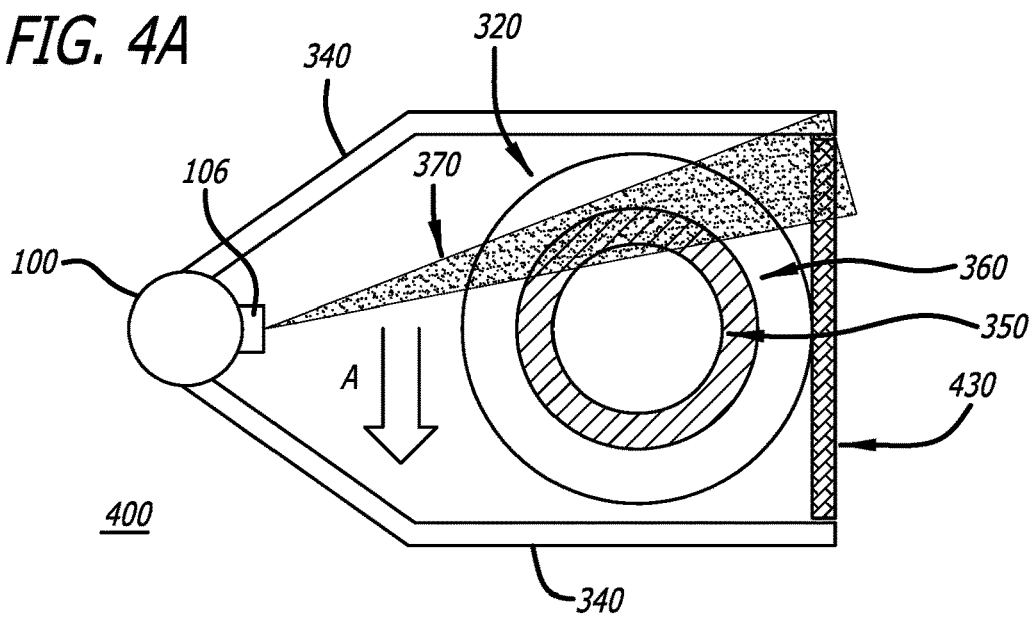
FIG. 4A is a diagram showing a top view of the disclosed system for a multi-spectral X-ray target and source comprising a two-dimensional (2D) X-ray detector, in accordance with at least one embodiment of the present disclosure.

FIG. 4A is a diagram showing a top view 400 of the disclosed system for a multi-spectral X-ray target and source comprising a two-dimensional (2D) X-ray detector 430, in accordance with at least one embodiment of the present disclosure. The system depicted in FIG. 4A is similar to the system depicted in FIG. 3A except that the system depicted in FIG. 4A employs a 2D X-ray detector 430 instead of a 1D X-ray detector 330. In addition, the operation of the system depicted in FIG. 4A is similar to the operation of the system depicted in FIG. 3A. As such, refer to the description of the system of FIG. 3A for details of the operation of the system of FIG. 4A.

Figure 4B:
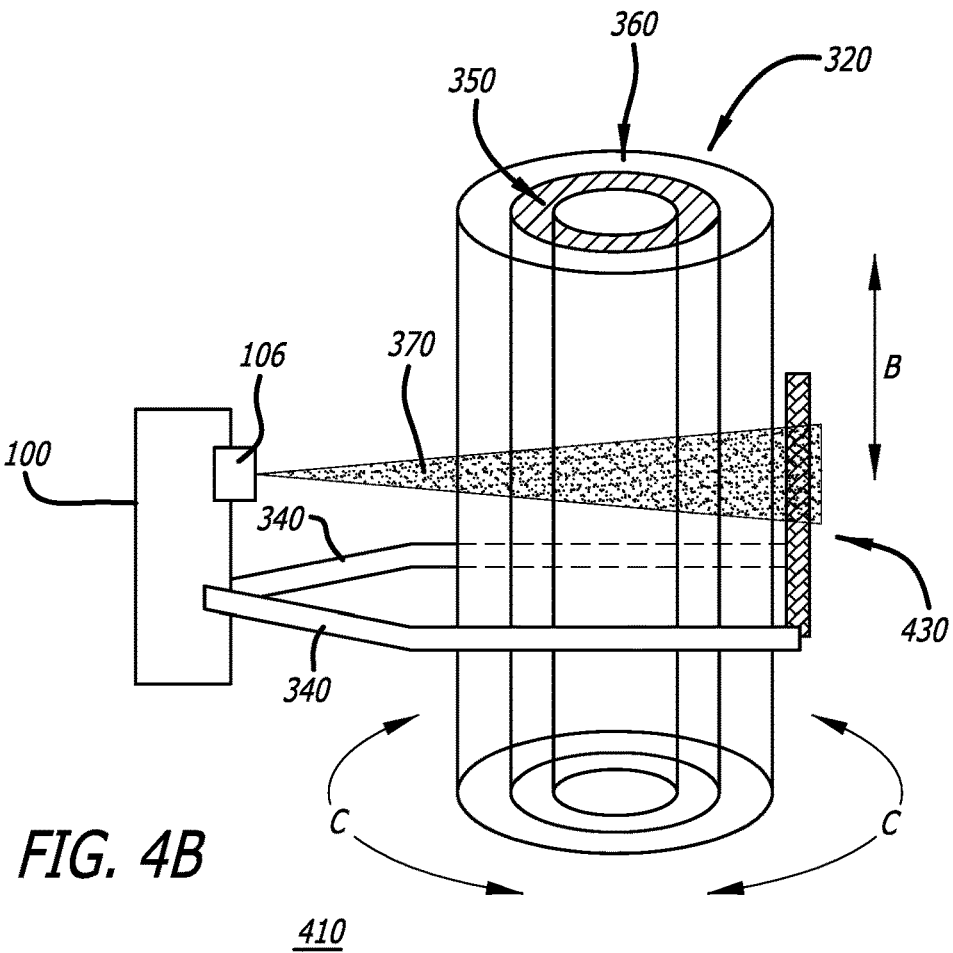
FIG. 4B is a diagram showing a side view of the disclosed system for a multi-spectral X-ray target and source comprising a 2D X-ray detector, in accordance with at least one embodiment of the present disclosure.

FIG. 4B is a diagram showing a side view 410 of the disclosed system for a multi-spectral X-ray target and source comprising a 2D X-ray detector 430, in accordance with at least one embodiment of the present disclosure. The operation of the system depicted in FIG. 4B is similar to the operation of the system depicted in FIG. 3B. Refer to the description of the system of FIG. 3B for details of the operation of the system of FIG. 4B.

Figure 5A:
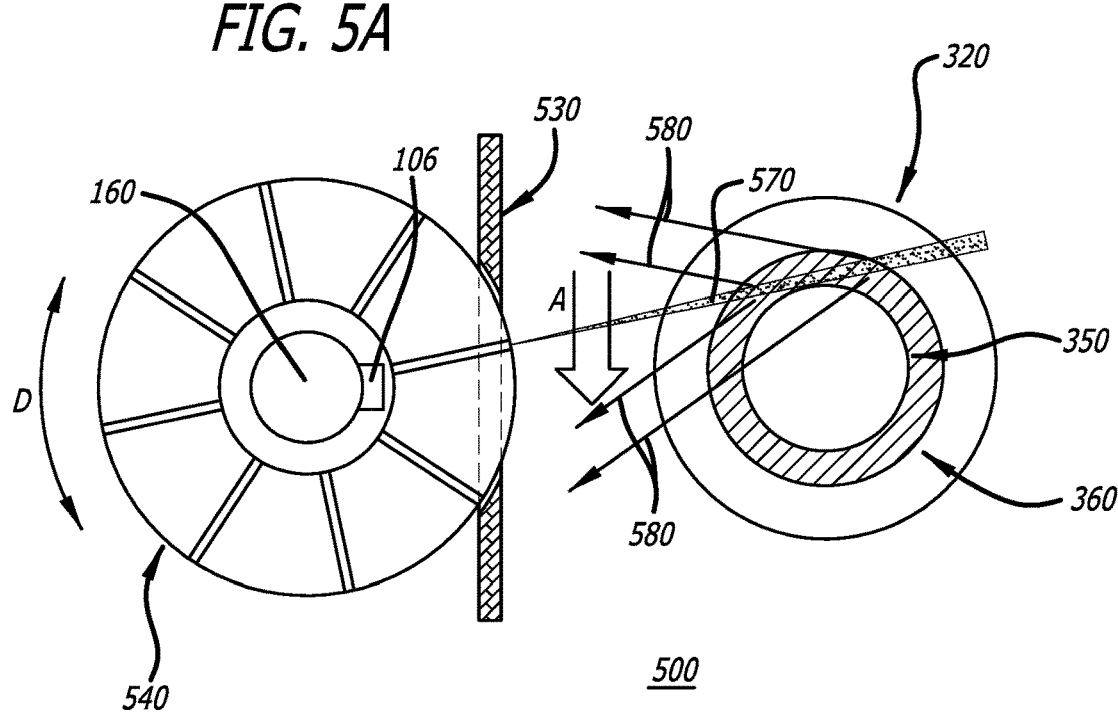
FIG. 5A is a diagram showing a top view of the disclosed system for a multi-spectral X-ray target and source comprising a two-dimensional (2D) X-ray detector, where the detector is detecting backscattered X-rays, in accordance with at least one embodiment of the present disclosure.

FIG. 5A is a diagram showing a top view 500 of the disclosed system for a multi-spectral X-ray target and source comprising a two-dimensional (2D) X-ray detector 530, where the detector 530 is detecting backscattered X-rays, in accordance with at least one embodiment of the present disclosure. In this figure, the system is shown to comprise a collimator 540 to collimate the X-ray beam generated by the X-ray generator 100. Also, in this figure, the X-ray detector 530 in this figure is a 2D X-ray detector that is configured to detect X-rays that are backscattered (e.g., backscattered X-rays) 580 off of the various different transitions between the layers (e.g., pipe 350 and insulation 360) of the specimen 320 to be discriminated.

During operation of the disclosed system, the X-ray generator 100 radiates an X-ray beam (e.g., comprising a set of X-rays or X-ray signals) that is collimated, by a rotating collimator 540, into a narrow X-ray beam 570. The collimator 540 is rotatable in either a clockwise direction or a counter clockwise direction (as denoted by the arrows of line D). As the collimator 540 rotates clockwise, the narrow X-ray beam 570 moves (i.e. scans) in the direction denoted by arrow A to scan a portion of the specimen 320. As the narrow X-ray beam 570 is being scanned across the surface of the specimen 320 and strikes the different transitions between the layers (e.g., pipe 350 and insulation 360) of the specimen 320, backscattered X-rays 580 are produced. The X-ray detector 530 detects the backscattered X-rays 580.

It should be noted that, in other embodiments, the collimator 540 may rotate counter clockwise. For these embodiments, when the collimator 540 rotates counter clockwise, the narrow X-ray beam 570 will move in a direction that is opposite the direction denoted by arrow A.

Figure 5B:
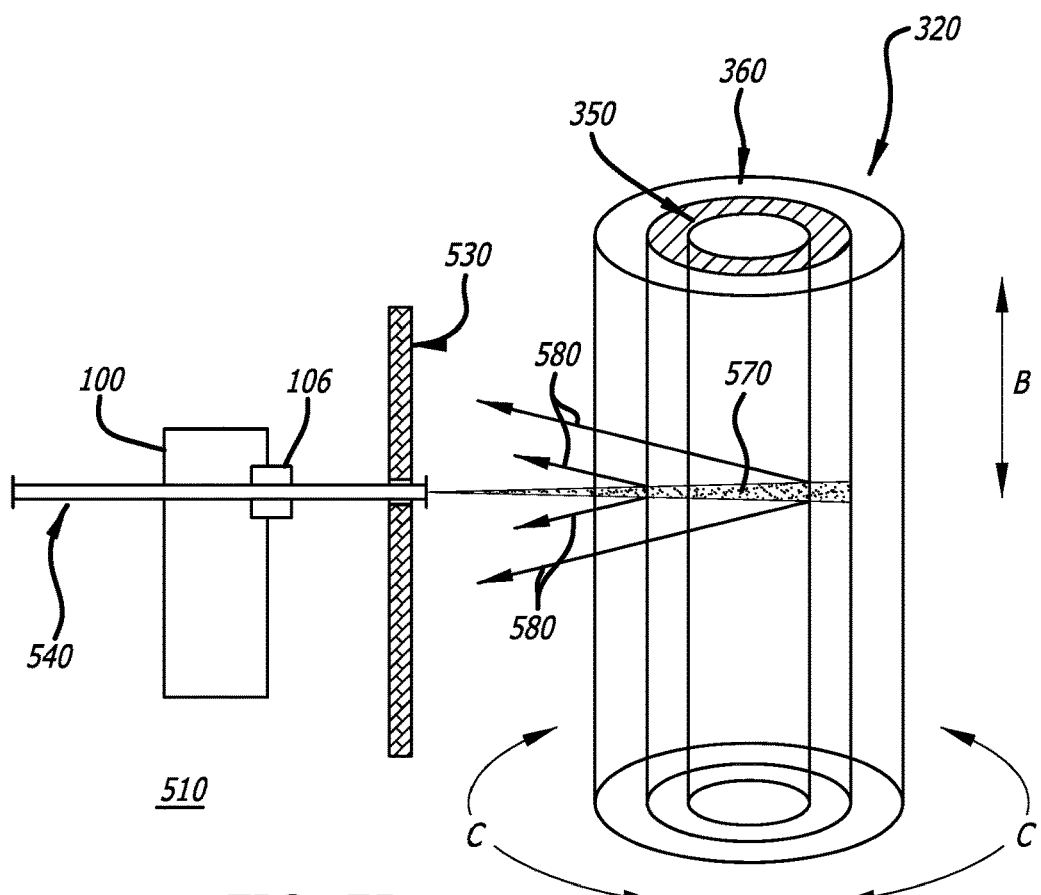
FIG. 5B is a diagram showing a side view of the disclosed system for a multi-spectral X-ray target and source comprising a 2D X-ray detector, where the detector is detecting backscattered X-rays, in accordance with at least one embodiment of the present disclosure.

FIG. 5B is a diagram showing a side view 510 of the disclosed system for a multi-spectral X-ray target and source comprising a 2D X-ray detector 530, where the detector 530 is detecting backscattered X-rays, in accordance with at least one embodiment of the present disclosure. In this figure, the side view 510 illustrates how the X-ray generator 100 (along with the attached X-ray detector 530) may move up and down (as denoted by the arrows of line B) along the length of the specimen 320 to scan all of the locations along the length of the specimen 320. In addition, in one or more embodiments, the X-ray generator 100 may rotate around the circumference of the specimen 320 (as denoted by the arrows of lines C) to scan the specimen 320.

Figure 6:
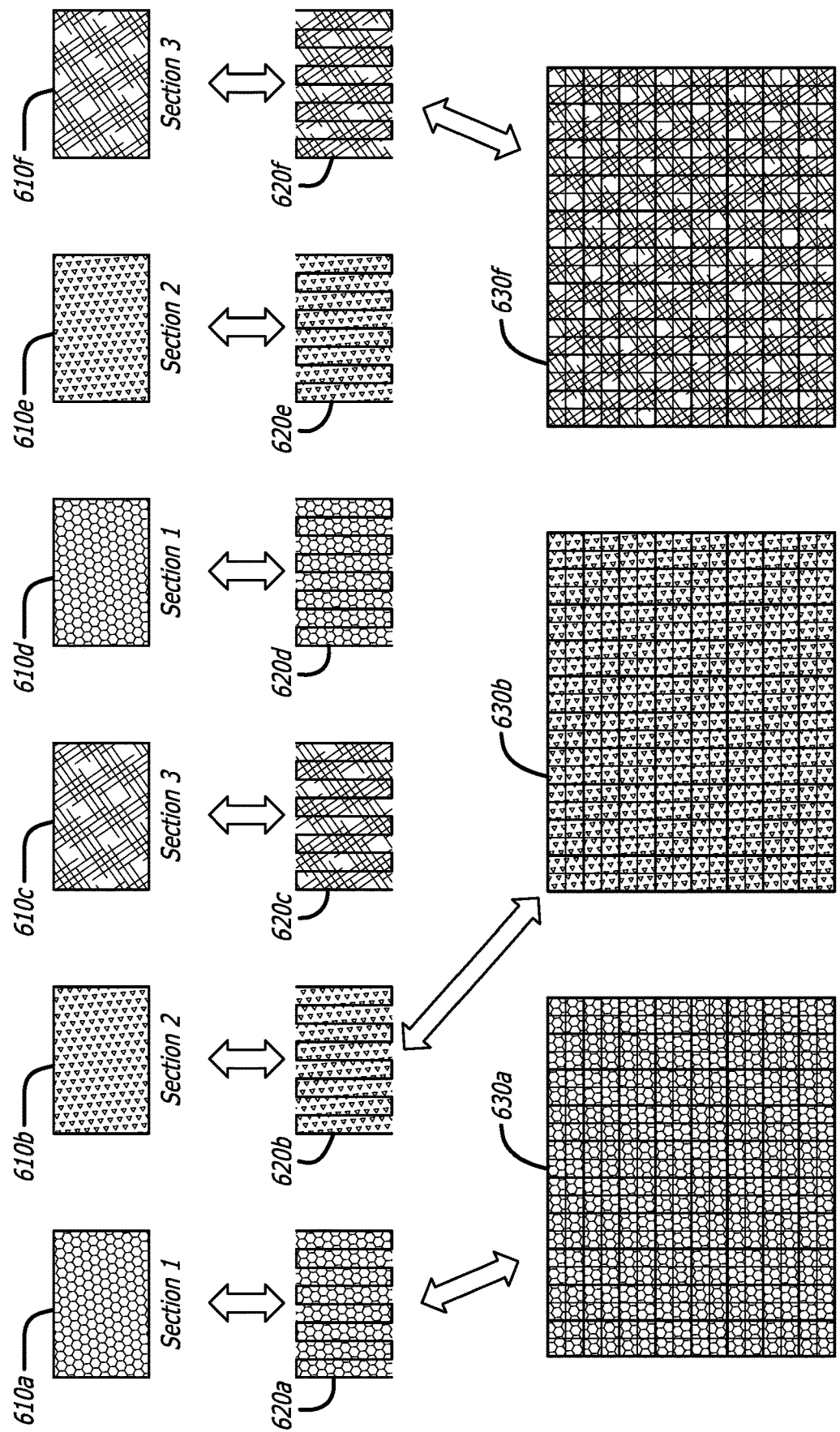
FIG. 6 is a diagram showing exemplary images being constructed from the X-ray data collected for each of the different X-ray generating materials of sections of the multi-spectral X-ray target of the disclosed system for a multi-spectral X-ray target and source, in accordance with at least one embodiment of the present disclosure.

FIG. 6 is a diagram showing exemplary images 630a, 630b, 630f being constructed from the X-ray data 620a, 620b, 620c, 620d, 620e, 620f collected for each of the different X-ray generating materials of sections 610a, 610b,

610*c*, 610*d*, 610*e*, 620*f* of the multi-spectral X-ray target (e.g., refer to 121 of FIG. 1C) of the disclosed system for a multi-spectral X-ray target and source, in accordance with at least one embodiment of the present disclosure. In this figure, data 620*a*, 620*b*, 620*c*, 620*d*, 620*e*, 620*f*, which each comprises a sequence of digitized intensities, is shown that is collected from X-rays generated by the various different X-ray generating materials of the sections 610*a*, 610*b*, 610*c*, 610*d*, 610*e*, 620*f* of the multi-spectral X-ray target. It should be noted that sections 610*a* and 610*d* of the multi-spectral X-ray target have the same X-ray generating material (e.g., Tungsten (W)), sections 610*b* and 610*e* of the multi-spectral X-ray target have the same X-ray generating material (e.g., Rhenium (Re)), and sections 610*b* and 610*e* of the multi-spectral X-ray target have the same X-ray generating material (e.g., Molybdenum (Mo)).

Also shown in this figure, individual images 630*a*, 630*b*, 630*f* are generated for each section 610*a*, 610*b*, 610*f* of the multi-spectral X-ray target. It should be noted that although FIG. 7 only shows images 630*a*, 630*b*, 630*f* for three of the sections 610*a*, 610*b*, 610*f* of the multi-spectral X-ray target; images for the remaining sections 610*c*, 610*d*, 610*e* of the multi-spectral X-ray target would also be generated. Once all of the images 630*a*, 630*b*, 630*f* are generated from the data 620*a*, 620*b*, 620*c*, 620*d*, 620*e*, 620*f*; a conglomeration image of the specimen is generated by merging all of the images 630*a*, 630*b*, 630*f* together. Then, the conglomeration image is analyzed, by at least one processor, for discrimination and/or identification of the specimen.

FIG. 7A is a diagram showing the disclosed system 700 for a multi-spectral X-ray target and source, in accordance with at least one embodiment of the present disclosure. In this figure, the system 700 is shown to comprise an X-ray generator 100 to generate X-rays, and an anode driver 720 to rotate the multi-spectral X-ray target 101 of the X-ray generator 100. Also in this figure, the system 700 is shown to comprise synchronization circuits and an encoder 740 to synchronize the rotation of the multi-spectral X-ray target 101 with the X-ray detector, and to determine the specific section of the multi-spectral X-ray target 101 that generated the set of X-rays that were detected by the X-ray detector at a specific time. In addition, the system 700 is shown to comprise a detector multiplexer and driver processor 730 to receive the detected X-rays and/or backscattered X-rays, and to digitize the received data into lines of pixels. Further, the system comprises an image processor 750 to generate an image using the digitized data for each section of the multi-spectral X-ray target 101. In addition, the image processor 750 is further to generate a conglomeration image of the specimen by merging all of the generated images for the sections together.

Figure 7B:
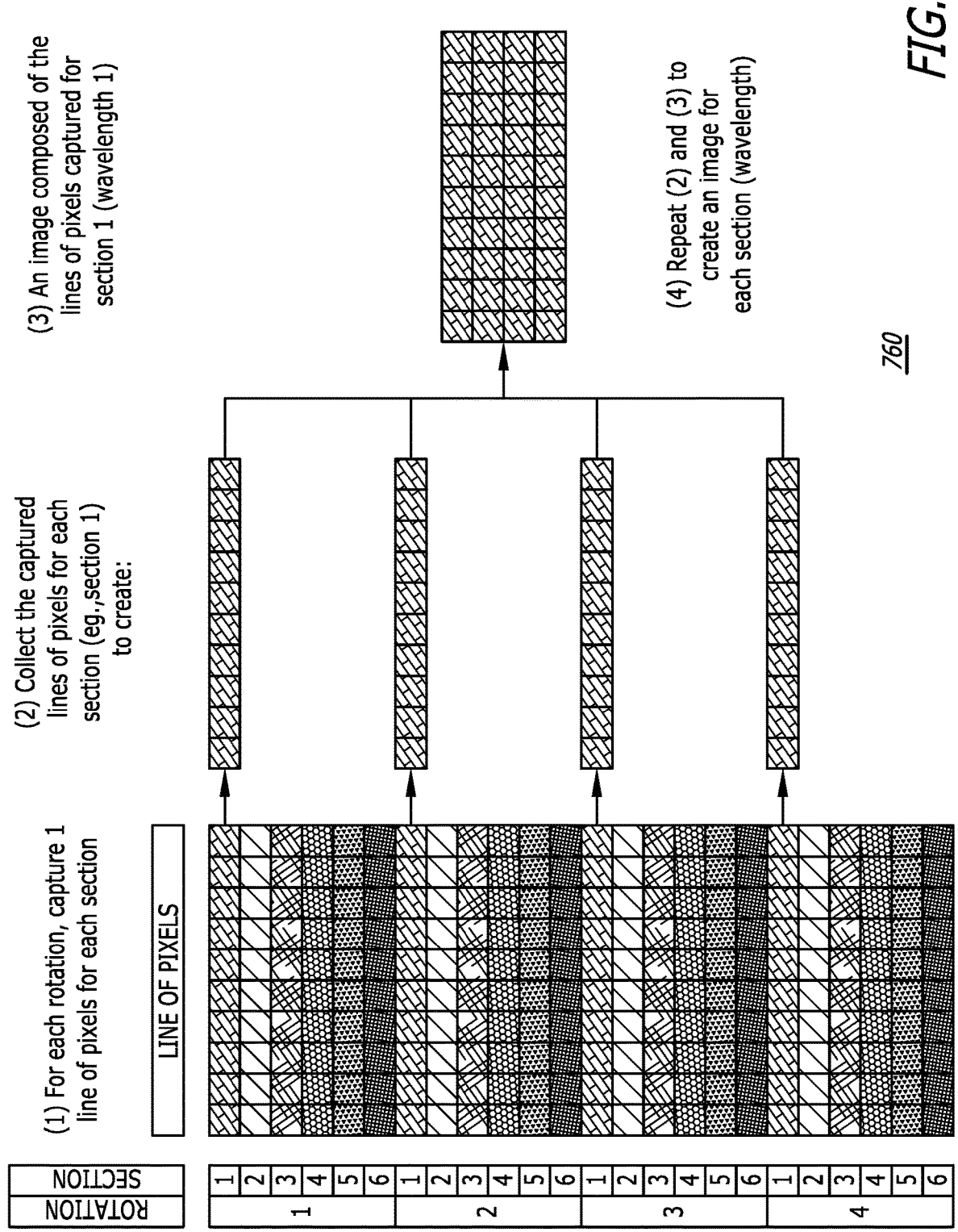
FIG. 7B is a diagram illustrating the method for generating an image using data from a section of the multi-spectral X-ray target, in accordance with at least one embodiment of the present disclosure.

FIG. 7B is a diagram 760 illustrating the disclosed method for generating an image using data from a section of the multi-spectral X-ray target 101, in accordance with at least one embodiment of the present disclosure. For this figure, the multi-spectral X-ray target 101 comprises a total of six (6) sections (e.g., refer to the multi-spectral X-ray target 101 of FIG. 1A). Each of the six sections of the multi-spectral X-ray target 101 comprises a different X-ray generating material (e.g., refer to the multi-spectral X-ray target 101 of FIG. 1A, where the different X-ray generating materials are denoted by the different patterns shown for each section of the multi-spectral X-ray target 101).

During operation of the disclosed system, when the X-ray generator 100 along with the attached X-ray detector 330 are at a first location on the specimen 320 to be discriminated, the multi-spectral X-ray target 101 is rotated one full rotation, and data from the detected X-rays radiated through and/or reflected off of the specimen 320 is captured for each section of the multi-spectral X-ray target 101. FIG. 7B shows that data has been captured for all of the sections (i.e. a total of 6 sections) of the multi-spectral X-ray target 101 for a total of four (4) full rotations of the multi-spectral X-ray target 101. Data is in the form of a line of pixels for each section (e.g., section 1) of the multi-spectral X-ray target 101 for each rotation. After all of the data has been captured, all of the data for a particular section (e.g., section 1) is merged together to form a single spectral image of the specimen 320 for that section (e.g., section 1).

After data has been captured for all of the sections (e.g., a total of 6 sections) of the multi-spectral X-ray target 101 for at least one full rotation of the multi-spectral X-ray target 101, the X-ray generator 100 along with the attached X-ray detector 330 are moved to a second location on the specimen 320, and the method is repeated for all of the remaining locations of the specimen 320 to be scanned.

Figure 7C:
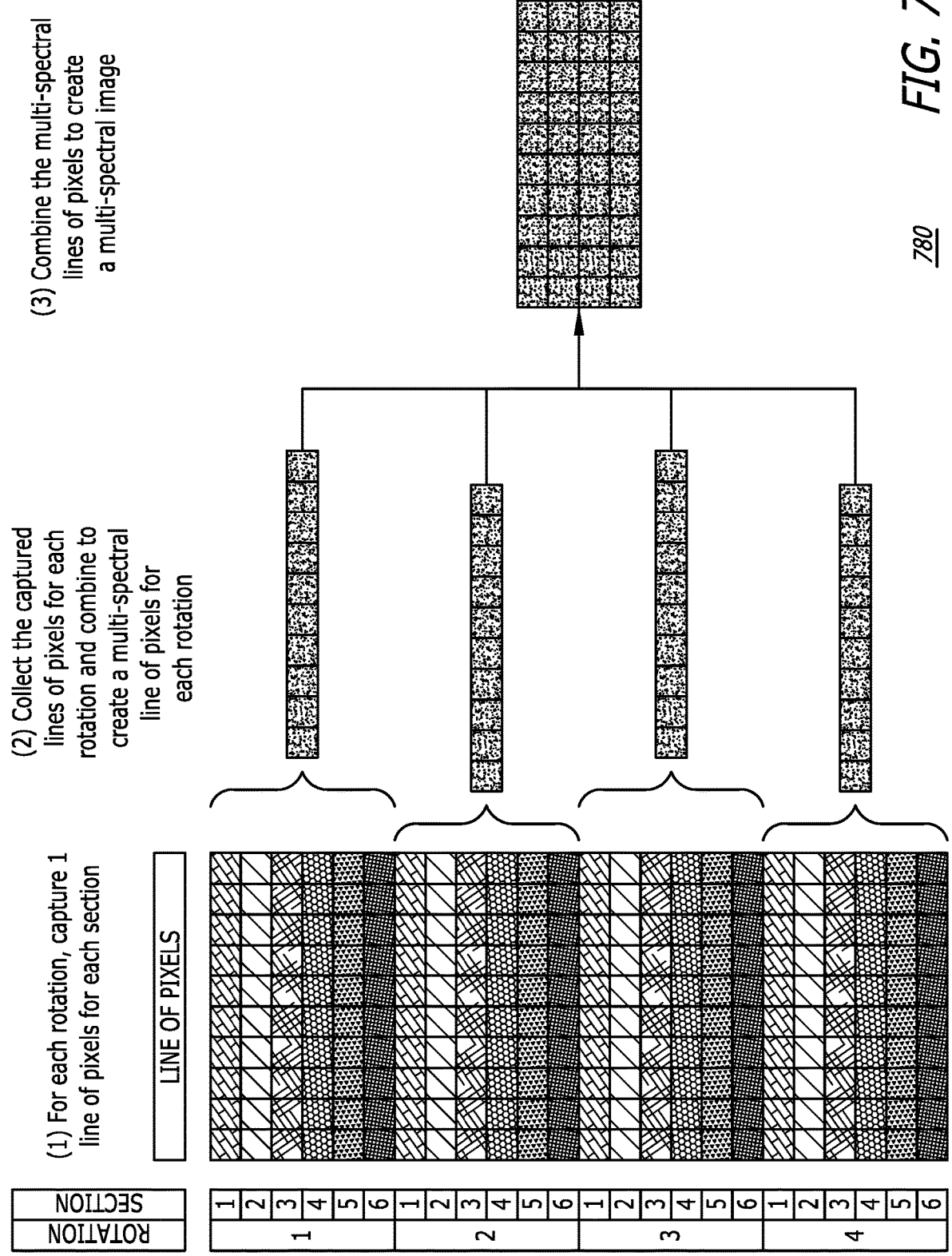
FIG. 7C is a diagram illustrating the method for generating a multi-spectral image using data from all of the section of the multi-spectral X-ray target, in accordance with at least one embodiment of the present disclosure.

FIG. 7C is a diagram 780 illustrating the disclosed method for generating a multi-spectral image using data from all of the sections of the multi-spectral X-ray target 101, in accordance with at least one embodiment of the present disclosure. Similar to FIG. 7B, for this figure, the multi-spectral X-ray target 101 comprises a total of six (6) sections (e.g., refer to the multi-spectral X-ray target 101 of FIG. 1A). Each of the six sections of the multi-spectral X-ray target 101 comprises a different X-ray generating material (e.g., refer to the multi-spectral X-ray target 101 of FIG. 1A, where the different X-ray generating materials are denoted by the different patterns shown for each section of the multi-spectral X-ray target 101).

During operation of the disclosed system, when the X-ray generator 100 along with the attached X-ray detector 330 are at a first location on the specimen 320 to be discriminated, the multi-spectral X-ray target 101 is rotated one full rotation, and data from the detected X-rays radiated through and/or reflected off of the specimen 320 is captured for each section of the multi-spectral X-ray target 101. FIG. 7C shows that data has been captured for all of the sections (i.e. a total of 6 sections) of the multi-spectral X-ray target 101 for a total of four (4) full rotations of the multi-spectral X-ray target 101. Data is in the form of a line of pixels for each section (e.g., section 1) of the multi-spectral X-ray target 101 for each rotation. After all of the data has been captured, all of the data for all of the sections (e.g., a total of 6 sections) for a particular rotation (e.g., rotation 1) is merged together to form a multi-spectral line of pixels. Then, all of the multi-spectral lines of pixels are merged together to form a multi-spectral image of the specimen 320.

After data has been captured for all of the sections (e.g., a total of 6 sections) of the multi-spectral X-ray target 101 for at least one full rotation of the multi-spectral X-ray target 101, the X-ray generator 100 along with the attached X-ray detector 330 are moved to a second location on the specimen 320, and the method is repeated for all of the remaining locations of the specimen 320 to be scanned.

FIGS. 8A and 8B together are a flow chart showing the disclosed method for a multi-spectral X-ray target and source, in accordance with at least one embodiment of the present disclosure. At the start 800 of the method, a source of an X-ray generator emits electrons towards a section of a multi-spectral X-ray target of the X-ray generator 810. In one or more embodiments, the multi-spectral X-ray target is rotatable and comprises a plurality of sections, and each of the sections comprises an X-ray generating material. Then, the section of the multi-spectral X-ray target generates a set of X-rays, when the electrons impinge on the section of the multi-spectral X-ray target 820. The set of X-rays then radiates through an X-ray window of the X-ray generator towards at least a portion of the specimen 830. Then, the set of X-rays strikes at least a portion of the specimen to produce a set of backscattered X-rays 840. At least one X-ray detector then detects the set of X-rays and/or the set of backscattered X-rays 850. Then, an anode driver rotates the multi-spectral X-ray target such that the source is in position to project the electrons towards another section of the multi-spectral X-ray target 860. Then, the preceding steps (810, 820, 830, 840, 850, and 860) are repeated for all of the remaining sections of the multi-spectral X-ray target 870. The X-ray system is then moved to another scanning location of the specimen 880. Then, the preceding steps (810, 820, 830, 840, 850, 860, 870, and 880) are repeated for all of the remaining scanning locations of the specimen 890. At least one processor then processes at least some of the detected sets of X-rays and/or at least some of the detected sets of backscattered X-rays for at least some of the locations of the specimen to discriminate (and optionally identify) the specimen 895. Then, the method ends 897.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for operating an X-ray generator, the method comprising:

emitting, by a source of the X-ray generator, electrons towards a first section of a multi-spectral X-ray target of the X-ray generator, wherein the multi-spectral X-ray target is rotatable about an axis perpendicular to a motion of the electrons and comprises a plurality of sections, which are each radially extending, including the first section, and wherein each of the sections comprises an X-ray generating material and at least two of the sections comprise a different X-ray generating material; and generating, by the first section of the multi-spectral X-ray target, a first set of X-rays, when the electrons impinge on the first section of the multi-spectral X-ray target, wherein the first set of X-rays comprises a first peak characteristic energy.

2. The method of claim 1, wherein the method further comprises:

rotating, by an anode driver, the multi-spectral X-ray target such that the source is in position to project the electrons towards a second section of the multi-spectral X-ray target;

emitting, by the source, the electrons towards the second section of the multi-spectral X-ray target of the X-ray generator; and generating, by the second section of the multi-spectral X-ray target, a second set of X-rays, when the electrons impinge on the second section of the multi-spectral X-ray target.

3. The method of claim 2, wherein the second section of the multi-spectral X-ray target comprises a different X-ray generating material than the first section, and wherein the second set of X-rays comprises a second peak characteristic energy.

4. The method of claim 2, wherein the method further comprises:

repeating, for all remaining sections of the multi-spectral X-ray target, rotating the multi-spectral X-ray target such that the source is in position to project the electrons towards another section of the multi-spectral X-ray target, emitting the electrons towards the another section of the multi-spectral X-ray target, and generating another set of X-rays.

5. The method of claim 1, wherein each of the sections of the multi-spectral X-ray target comprises a different X-ray generating material than one another, and wherein sets of X-rays generated by each of the sections of the multi-spectral X-ray target each comprise a different peak characteristic energy.

6. The method of claim 1, wherein each of the X-ray generating materials is one of Tungsten (W), Rhenium (Re), Molybdenum (Mo), Niobium (Nb), Tantalum (Ta), or Iridium (Ir).

7. A method for discriminating a specimen, the method comprising:

emitting, by a source of an X-ray generator, electrons towards a first section of a multi-spectral X-ray target of the X-ray generator, wherein the multi-spectral X-ray target is rotatable about an axis perpendicular to a motion of the electrons and comprises a plurality of sections, which are each radially extending, including the first section, and wherein each of the sections comprises an X-ray generating material and at least two of the sections comprise a different X-ray generating material;

generating, by the first section of the multi-spectral X-ray target, a first set of X-rays, when the electrons impinge on the first section of the multi-spectral X-ray target, wherein the first set of X-rays comprises a first peak characteristic energy;

radiating, through an X-ray window of the X-ray generator, the first set of X-rays towards at least a portion of the specimen;

detecting, by at least one X-ray detector, at least one of the first set of X-rays or a first set of backscattered X-rays, which are produced by the first set of X-rays striking the at least a portion of the specimen; and processing, by at least one processor, at least one of the first set of X-rays or the first set of backscattered X-rays to discriminate the specimen.

8. The method of claim 7, wherein the method further comprises:
rotating, by an anode driver, the multi-spectral X-ray target such that the source is in position to project the electrons towards a second section of the multi-spectral X-ray target;
emitting, by the source, the electrons towards the second section of the multi-spectral X-ray target of the X-ray generator;
generating, by the second section of the multi-spectral X-ray target, a second set of X-rays, when the electrons impinge on the second section of the multi-spectral X-ray target;
radiating, through an X-ray window of the X-ray generator, the second set of X-rays towards the at least a portion of the specimen;
detecting, by the at least one X-ray detector, at least one of the second set of X-rays or a second set of backscattered X-rays, which are produced by the second set of X-rays striking the at least a portion of the specimen; and
processing, by the at least one processor, at least one of the second set of X-rays or the second set of backscattered X-rays to further discriminate the specimen.

9. The method of claim 8, wherein the second section of the multi-spectral X-ray target comprises a different X-ray generating material than the first section, and
wherein the second set of X-rays comprises a second peak characteristic energy.

10. The method of claim 8, wherein the method further comprises repeating, for all remaining sections of the multi-spectral X-ray target, rotating the multi-spectral X-ray target such that the source is in position to project the electrons towards another section of the multi-spectral X-ray target, emitting the electrons towards the another section of the multi-spectral X-ray target, generating another set of X-rays, radiating the another set of X-rays towards the at least a portion of the specimen, detecting at least one of the another set of X-rays or another set of backscattered X-rays, and processing at least one of the another set of X-rays or the another set of backscattered X-rays to further discriminate the specimen.

11. The method of claim 8, wherein the processing comprises:
digitizing, by a detector multiplexer and driver processor, at least one of at least one of the sets of X-rays or at least one of the sets of backscattered X-rays to generate an image for each of the sections of the multi-spectral X-ray target; and
generating, by an image processor, a conglomeration image of the specimen by merging all of the images for each of the sections together.

12. An X-ray generator system, the system comprising:
a multi-spectral X-ray target rotatable about an axis perpendicular to a motion of incoming electrons and comprising a plurality of sections, which are each radially extending,
wherein each of the sections comprises an X-ray generating material and at least two of the sections comprise a different X-ray generating material;
a source to emit the electrons towards a first section of the multi-spectral X-ray target; and
the first section to generate a first set of X-rays, when the electrons impinge on the first section of the multi-spectral X-ray target,
wherein the first set of X-rays comprises a first peak characteristic energy; and
an anode driver to rotate the multi-spectral X-ray target such that the source is in position to project the electrons towards another section of the multi-spectral X-ray target.

13. The system of claim 12, wherein the system her comprises an X-ray window to allow for the first set of X-rays to radiate through.

14. The system of claim 12, wherein the system further comprises at least one X-ray detector to detect at least one of the first set of X-rays or a first set of backscattered X-rays, which are produced by the first set of X-rays striking at least a portion of a specimen.

15. The system of claim 14, wherein the X-ray detector is one of a one-dimensional (1D) detector or a two-dimensional (2D) detector.

16. The system of claim 14, wherein the system further comprises at least one processor to process at least one of the first set of X-rays or the first set of backscattered X-rays to discriminate the specimen.

17. The system of claim 12, wherein each of the sections of the multi-spectral X-ray target comprises a different X-ray generating material than one another, and wherein sets of X-rays generated by each of the sections of the multi-spectral X-ray target each comprise a different peak characteristic energy.

18. The system of claim 12, wherein the multi-spectral X-ray target is a multi-facet target, and wherein an external surface of each of the sections comprises a facet.

19. The system of claim 12, wherein the multi-spectral X-ray target is a multi-sector target, and wherein an external surface of each of the sections comprises an arc.

20. A method for discriminating a specimen, the method comprising:
for each location to be scanned on the specimen, capturing data for at least one full rotation of a multi-spectral X-ray target of an X-ray generator,
wherein the multi-spectral X-ray target is rotatable about an axis perpendicular to a motion of incoming electrons and comprises a plurality of sections, which are each radially extending, and at least two of the sections comprise a different X-ray generating material,
wherein the data is in a form of a line of pixels for each of the sections for each of the tell rotations; and
at least one of merging all of the data for a particular section together to form a single spectral image of the specimen, or merging all of the data for each of the full rotations to form a multi-spectral line of pixels for each of the full rotations and merging all of the multi-spectral lines of pixels together to form a multi-spectral image of the specimen.

* * * * *

UNITED STATES PATENT AND TRADEMARK OFFICE
CERTIFICATE OF CORRECTION

PATENT NO. : 10,748,735 B2
APPLICATION NO. : 15/940796
DATED : August 18, 2020
INVENTOR(S) : Morteza Safai, Gary Georgeson and Barry R. Fox Page 1 of 1

It is certified that error appears in the above-identified patent and that said Letters Patent is hereby corrected as shown below:

In the Claims

Column 20, Line 14, Claim 13 please correct as follows:
13. The system of claim 12, wherein the system further Column 20, Line 52, Claim 20 please correct as follows:
of the sections for each of the full rotations; and Signed and Sealed this
Twenty-seventh Day of October, 2020

Andrei Iancu
*Director of the United States Patent and Trademark Office*